(12) United States Patent
Bartier et al.

(10) Patent No.: US 10,652,036 B2
(45) Date of Patent: May 12, 2020

(54) MULTI-NETWORK OPERATION WITH MEMBER NODE FOR MULTICAST GROUPS

(71) Applicant: Itron, Inc., Liberty Lake, WA (US)

(72) Inventors: Jerome Bartier, Edinburgh (GB); James Laurence Taylor, Sherborne (GB); Viet-Hung Nguyen, Saint-Mande (FR); Hartman Van Wyk, Montloius sur Loire (FR)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 15/824,898

(22) Filed: Nov. 28, 2017

(65) Prior Publication Data
US 2019/0165962 A1     May 30, 2019

(51) Int. Cl.
| | |
|---|---|
| *H04L 12/18* | (2006.01) |
| *H04L 12/715* | (2013.01) |
| *H04L 12/707* | (2013.01) |
| *H04L 12/761* | (2013.01) |
| *H04L 12/66* | (2006.01) |
| *H04L 12/753* | (2013.01) |

(52) U.S. Cl.
CPC .......... *H04L 12/185* (2013.01); *H04L 45/04* (2013.01); *H04L 45/16* (2013.01); *H04L 45/24* (2013.01); *H04L 12/66* (2013.01); *H04L 45/48* (2013.01)

(58) Field of Classification Search
CPC ....... H04L 12/185; H04L 45/04; H04L 45/16; H04L 45/24; H04L 12/66
See application file for complete search history.

(56) References Cited

U.S. PATENT DOCUMENTS

| | | | |
|---|---|---|---|
| 5,331,637 | A | 7/1994 | Francis et al. |
| 6,269,085 | B1 | 7/2001 | Provino et al. |
| 6,636,895 | B1 | 10/2003 | Li et al. |
| 2002/0021697 | A1* | 2/2002 | Tsuchiya ............... H04L 12/18 370/392 |
| 2005/0180447 | A1 | 8/2005 | Lim et al. |
| 2007/0127473 | A1 | 6/2007 | Kessler et al. |
| 2009/0052448 | A1 | 2/2009 | Ramakrishnan et al. |
| 2010/0020797 | A1 | 1/2010 | Casey et al. |
| 2012/0039186 | A1 | 2/2012 | Vasseur |
| 2013/0077627 | A1 | 3/2013 | Appalla et al. |

(Continued)

FOREIGN PATENT DOCUMENTS

| | | |
|---|---|---|
| JP | 2005229623 | 8/2005 |
| WO | WO2015135816 | 9/2015 |

OTHER PUBLICATIONS

Office action for U.S. Appl. No. 15/824,696, dated Jan. 26, 2019, Bartier, "Limiting Forwarding of Multicast Communications", 24 pages.

(Continued)

*Primary Examiner* — Peter P Chau
(74) *Attorney, Agent, or Firm* — Lee & Hayes, P.C.

(57) ABSTRACT

Techniques for bridging communication between multiple networks to facilitate distribution of multicast data are described herein. For example, a node that is able to communicate with its network and an adjacent network may send a subscription message indicating that the node is a member of a multicast group. The subscription message may be forwarded up both networks. The node may then forward, between the networks, data that is destined for members of the multicast group.

20 Claims, 14 Drawing Sheets

(56) References Cited

U.S. PATENT DOCUMENTS

| | | | |
|---|---|---|---|
| 2013/0250949 A1* | 9/2013 | Farinacci | H04L 12/1836 370/390 |
| 2015/0055652 A1 | 2/2015 | Yong et al. | |
| 2016/0142248 A1 | 5/2016 | Thubert et al. | |
| 2016/0254987 A1 | 9/2016 | Eckert et al. | |
| 2017/0019804 A1 | 1/2017 | Morchon et al. | |
| 2017/0264532 A1 | 9/2017 | Guo et al. | |
| 2019/0165961 A1 | 5/2019 | Bartier et al. | |
| 2019/0165964 A1 | 5/2019 | Bartier et al. | |

OTHER PUBLICATIONS

The PCT Search Report and Written Opinion dated Feb. 18, 2019, for PCT Application No. PCT/US2018/062626, 13 pages.

The PCT Search Report and Written Opinion dated Mar. 7, 2019 for PCT Application No. PCT/US2018/062638, 12 pages.

Lorente, Guillermo Gaston et al. "BMRF: Bidirectional Multicast RPL Forwarding", Department of Electronics and Informatics, University of Brussel, Oct. 5, 2016, 16 pages.

Tsvetkov, Tsvetko "Rpl: IPv6 Routing Protocol for Low Power and Lossy Networks", Network Architectures and Services, Jul. 2011, 8 pages.

Vasseur, JP et al. "RPL: IPv6 Routing Protocol for Low-Power and Lossy Networks", retrieved on Sep. 21, 2017 from <<http://www.rfc-archive.org/getrfc.php?rfc>>, 170 pages.

Internet Engineering Task Force (IETF), "Multicast Protocol for Low-Power and Lossy Networks (MPL)," retrieved on Jul. 1, 2019 from <<https://datatracker.ietf.org/doc/rfc7731/>> Feb. 2016, 3 pages.

Internet Engineering Task Force (IETF), "Multicast Using Bit Index Explicit Replication (BIER)," retrieved on Jul. 1, 2019 at <<https://datatracker.ietf.org/doc/rfc8279/>> Last updated Jun. 5, 2018, 3 pages.

IPR Details, "Lars Eggert's Statement about IPR related to draft-ietf-rolltrickle-mcast belonging to Nokia Corporation," retrieved on Jul. 1, 2019 from <<https://datatracker.ietf.org/ipr/1858/>> submitted on Aug. 3, 2012, 3 pages.

IPR, "Document IPR search results for draft-ietf-bier architecture," retrieved on Jul. 1, 20219 from <<https://datatracker.ietf.org/ipr/search/?submit=draft&id=draft-ietf-bier-architecture>> 3 pages.

The PCT Search Report and Written Opinion dated Nov. 20, 2019, for PCT Application No. PCT/US2019/053004, 12 pages.

* cited by examiner

MULTI-NETWORK OPERATION WITH MEMBER NODE FOR MULTICAST GROUPS

BACKGROUND

Nodes are often configured in a tree-like network structure, such as a Destination Oriented Directed Acyclic Graph (DODAG) with parent nodes, child nodes, and a root node. In many instances, a node belongs to one DODAG, and one network (e.g., one Personal Area Network (PAN)) at a given moment in time. The nodes often communicate multicast data to each other through the DODAG. For example, a node will forward multicast data destined for members of a multicast group upwards in the network node-by-node to reach a root node. The root node will then distribute the multicast data back down into the network node-by-node to reach the members of the multicast group. This results in a relatively large number of communications, often between nodes that are not members of the multicast group, ultimately causing network congestion. When the nodes are battery-powered, this increases battery consumption.

In addition, in many instances, nodes of separate networks (and separate DODAGs) belong to the same multicast group. Since the nodes are only configured to communicate within their own networks (e.g., intra-PAN communication), this results in members of a multicast group not receiving multicast data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
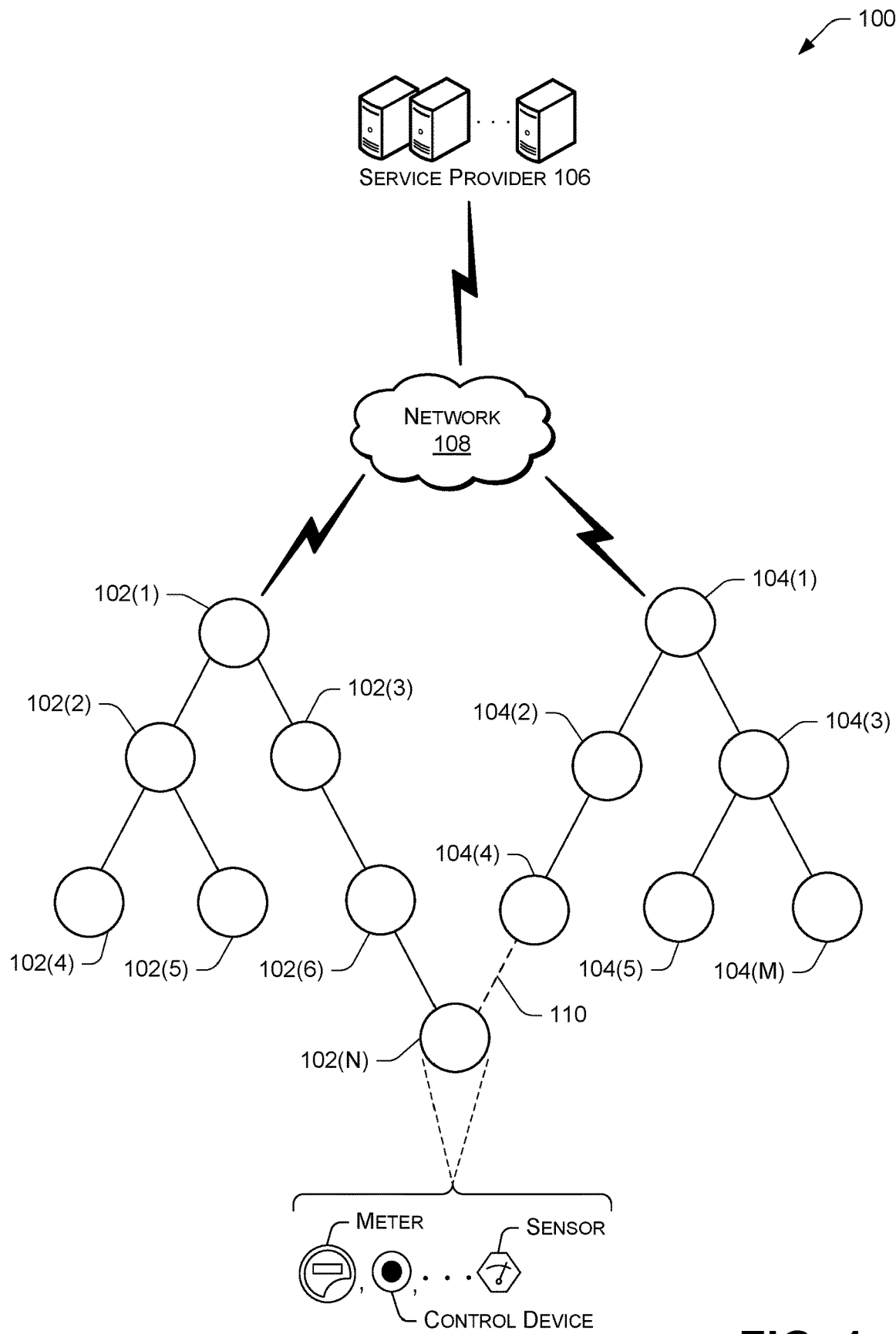
FIG. 1 is a schematic diagram of an example network architecture.

As discussed above, multicast communication within a tree-like network often requires a large number of communications to reach members of a multicast group. This causes network congestion and can consume battery power. In addition, since a node is only configured to communicate within its own network (e.g., intra-PAN communication), and members of a multicast group are often in several networks, this results in members of a multicast group not receiving multicast data.

This disclosure describes, in part, techniques directed to limiting forwarding of multicast communications. For example, the techniques intelligently forward multicast data along paths of a network where members of a multicast group are located. As such, nodes that do not lead to members of the multicast group may be pruned from distribution of the multicast data. This reduces network communications, ultimately conserving processing, communication, and/or battery resources of the nodes.

The techniques may be implemented in the context of a hierarchal network structure, such as a tree. Each node of the network may be connected wirelessly and/or wired to a parent node and/or child node. Each node may be associated with a hierarchical level, with a root node being associated with the highest level. As communications are sent upward in the network (i.e., uplink—from parent-to-parent), the communications travel closer to the root node. Meanwhile, as communications are sent downward in the network (i.e., downlink—from child-to-child), the communications travel farther from the root node.

In one illustration, the techniques may form a Point-to-Multipoint Sub-Tree (PST) for a multicast group to limit unnecessary data forwarding. The PST may be formed as nodes subscribe and/or unsubscribe to the multicast group. A node may subscribe to (i.e., join) the multicast group by sending a subscription message to advertise membership in the multicast group. The subscription message may be transmitted node-by-node up the network to a root node. The path or chain of nodes from the node originating the subscription message to the root node may form a forwarding chain. Each node that receives a subscription message may view the subscription message to maintain a count of child nodes from which the node has received a subscription message for a particular multicast group (also referred to as child count of received subscriptions).

Each node of the network may also maintain a pruning state indicating whether or not to forward data for a multicast group. When the pruning state is enabled, a node will generally not forward on multicast data, unless another condition is satisfied, such as being a common ancestor. In contrast, when the pruning state is disabled, the node will forward multicast data.

As part of forming the PST, the techniques may disable or enable a pruning state by sending a message (sometimes referred to as a "Member-in-Path (MinP)" message) to a node instructing such change. In one example, a parent node sends a message to a child node to disable the child's pruning state when the parent node has received a subscription message for a multicast group from two or more different child nodes. The message may be sent downward along nodes of a forwarding chain to disable the pruning state of the nodes along the forwarding chain. Here, the parent node may be referred to as a "common ancestor,"

since it has members in two or more branches. This may allow multicast data to be forwarded from one branch to another branch (i.e., from a child in one branch to a child in another branch).

In another example of updating a pruning state, a parent node sends a message to a child node to disable the child's pruning state when the parent node is a member of a multicast group and is located on a forwarding chain for the multicast group. The message may be sent downward along nodes of a forwarding chain to disable the pruning state of the nodes along the forwarding chain. Here, the parent node may be referred to as a "member ancestor" or a "member-in-path," since the parent node is a member along a path to the root node (e.g., the parent member is located on a forwarding chain established for another member). This may allow multicast data that originates in a member in a lower level to be distributed to a member in a higher level, and vice versa.

The PST may be used to limit distribution of multicast data within the network. In particular, the techniques may limit forwarding of multicast data to branches that lead to members of a multicast group. For example, the techniques may prune a forwarding chain to limit unnecessary data forwarding. In many instances, multicast data for a multicast group may be forwarded from a node (either upwards or downwards in the network) if a pruning state is disabled for the node for the multicast group and/or if a child count of received subscriptions for the multicast group is two or greater (e.g., the node is a common ancestor). This may intelligently distribute the multicast data along paths where members of the multicast group are located.

This disclosure also describes techniques directed to bridging communication between multiple networks to facilitate distribution of multicast data. As noted above, in many instances nodes of separate networks (and separate DODAGs) belong to the same multicast group. In order to distribute multicast data to the members of the multicast group that span multiple networks, the techniques identify a particular node that is able to communicate with a node from each network and instruct the particular node to act as a bridge between the networks. The particular node may become a virtual member of the multicast group and forward multicast data from either network to the other network. This may allow multicast data for a multicast group to be distributed to members of the multicast group that are located in separate networks.

In one illustration, a root node of a network collects information from nodes of its network to send to a central agent. In particular, the root node receives subscription messages regarding subscriptions of nodes of its network to one or more multicast groups. The root node may also receive messages originating from nodes of adjacent networks. Additionally, or alternatively, the root node may receive messages from nodes in its network indicating that the nodes can hear a node in an adjacent network. The root node compiles a list of multicast groups that have members in its network and a list of networks that could communicate with the network. These lists are sent to the central agent. In a similar fashion, other root nodes of other networks compile lists and send those lists to the central agent.

The central agent analyzes the lists from the root nodes to bridge communication for a multicast group. Specifically, the central agent determines networks that have members of the same multicast group. For example, the central agent may determine that a first network and a second network both have members of the same multicast group. The central agent also determines networks that are adjacent to each other and/or are required to form a path to the networks that have members of the same multicast group. The central agent then sends a message to a root node of a network requesting that communication between two or more networks be bridged for a multicast group.

Upon receiving the message from the central agent, the root node selects a node to act as the bridge between the networks for the multicast group. The root node may select a node within its network that is able to communicate with a node from the adjacent network for which communication is being bridged. Various criteria for selecting the node may be used, such as minimum distance from a member of the multicast group, and so on. The root node sends a message down through the network to the selected node instructing the selected node to bridge communication between the networks for the multicast group.

The bridging node then becomes a virtual member of the multicast group. In particular, the bridging node may send a subscription message for the multicast group to the root node of its network and a subscription message for the multicast group to the root node of the adjacent network. Each subscription message indicates that the bridging node is becoming a virtual member of the multicast group. This may cause a PST to be formed within the two networks to facilitate distribution of multicast data for the multicast group. Thereafter, the bridging node may forward multicast data that originates in one network to members of the multicast group that are located in the adjacent network, and vice versa.

This process may be repeated any number of times for any number of multicast groups. For example, a node may be configured to act as a bridge for a first multicast group and the same node or a different node may be configured to act as a bridge for a second multicast group. As such, connection points between networks may be created for various multicast groups.

In addition, this process may be repeated for any number of networks. For example, the central agent may determine that three or more networks need to be bridged to facilitate distribution of multicast data for a multicast group. In some instances, each of the networks includes at least one member of the multicast group. In other instances, a network may act as an intermediary connection between networks that include members of the multicast group. Here, the intermediary network may not include members of the multicast group, but may create a path of distribution between other networks.

The techniques are discussed in many instances in the context of a hierarchical tree-like network. For example, the techniques may be implemented within a Routing Protocol for Low Power and Lossy Networks (RPL) where nodes are configured in a DODAG. However, the techniques may be applied to other types of networks, such as a mesh network. Further, although the techniques are discussed in the context of multicast communication with any node of the network originating multicast data for members of a multicast group (e.g., anysource multicast), the techniques may be applied to other types of communication, such as unicast, and so on.

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management, or any other type of wireless or wired network. Unless specifically described to the contrary, the techniques described herein are applicable to any communication network, control network, and/or another type of network or system. In one example, the techniques may be implemented in the context of the Internet of Things (IoT).

Example Environment

FIG. 1 is a diagram illustrating an example networked environment or architecture 100. The architecture 100 includes network communication devices 102(1)-102(N) (also referred to as nodes 102) associated with a first Area Network (AN) and network communication devices 104(1)-104(M) (also referred to as nodes 104) associated with a second AN, where N and M are each an integer greater than or equal to 1. The network communication devices 102 and/or the network communication devices 104 may communicate with a service provider 106 via one or more networks 108 (e.g., a backhaul network), such as the Internet. The node 102(1) may generally act as a root node to connect the nodes 102 of the first AN to the service provider 106 via the one or more networks 108. Similarly, the node 104(1) may act as a root node to connect the nodes 104 of the second AN to the service provider 106 via the one or more networks 108. For instance, the nodes 102 may be configured in a Destination Oriented Directed Acyclic Graph (DODAG) with the node 102(1) acting as the DODAG root, while the nodes 104 may also be configured in a DODAG with the node 104(1) acting as the DODAG root. The node 102(1) and/or the node 104(1) may comprise an edge device.

As used herein, the term "Area Network" (AN) refers to a defined group of devices that are in communication with one another via one or more wired or wireless links. Examples of ANs include, for example, Local Area Networks (LANs), Wide Area Networks (WANs), Neighborhood Area Networks (NANs), Personal Area Networks (PANs), Home Area Networks (HANs), Field Area Networks (FANs), and so on. In some instances, multiple ANs exist and collectively define a larger network, such as an advanced metering infrastructure (AMI) of a utility communication network. In general, a network communication device is a member of a particular AN. Although in some instances, a network communication device may be a member of multiple ANs. Further, over time, network communication devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels. The plurality of channels may include a data channel(s) and/or a control channel(s) that is designated for communicating messages to specify the data channel(s) to be utilized to transfer data. Transmissions on a control channel may be shorter relative to transmissions on a data channel. The AN may implement a channel hopping sequence, such that a channel may change over time.

The service provider 106 may provide remote resources to the network communication devices 102 and/or 104. In some instances, the service provider 106 comprise one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. The network communication devices 102 and/or 104 may register or interact with some or all of these one or more central office systems. In one example, the one or more central office systems may implement a meter data management system to collect resource consumption data (e.g., data regarding usage of water, gas, electricity, etc. at a meter) from the network communication devices 102 and/or 104, process the resource consumption data, provide data regarding resource consumption to customers, utilities, and others, and/or perform a variety of other functionality. In other instances, the service provider 106 comprises other systems to implement other functionality, such as web services, cloud services, and so on. In yet other instances, the service provider 106 may be implemented as other types of devices, such as in the context of the Internet of Things (IoT) that allows a variety of devices to exchange data. In some instances, the service provider 106 may be referred to as a central agent.

The service provider 106 may be physically located in a single central location, or may be distributed at multiple different locations. The service provider 106 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

The service provider 106 may be implemented as one or more computing devices including servers, desktop computers, or the like. In one example, the service provider 106 is configured in a server cluster, server farm, data center, mainframe, cloud computing environment, or a combination thereof. To illustrate, the service provider 106 may operate as a cloud computing device that provides cloud services, such as storage, processing, and so on.

The network communication devices 102, the network communication devices 104, and/or the service provider 106 may transmit and/or receive Protocol Data Units (PDUs). A PDU may comprise a bit, frame, packet, segment, or another unit of data. A PDU may include control data and/or payload data. As used herein, a message, transmission, communication, or the like may refer to any type of PDU.

The network communication devices 102, the network communication devices 104, and/or the service provider 106 may perform various operations to facilitate the techniques discussed herein. For example, any of the network communication devices 102 and/or 104 may form a Point-to-Multipoint Sub-Tree (PST) for a multicast group and/or distribute multicast data according to the PST. Additionally, or alternatively, the first AN of the nodes 102 may connect to the second AN of the nodes 104, such as through a link 110.

Although the techniques are discussed in many instances with the ANs being implemented as tree-like structures having parent and child nodes, such as DODAGs, in some instances the ANs may be implemented in different network structures. For example, an AN may be implemented in whole or part by other types of networks, such as hub-and-spoke networks, mobile networks, cellular networks, etc. Regardless of the topology of an AN, individual network communication devices may communicate by wireless (e.g., radio frequency) and/or wired (e.g., power line communication, Ethernet, serial, etc.) connections.

Example Network Communication Device

Figure 2:
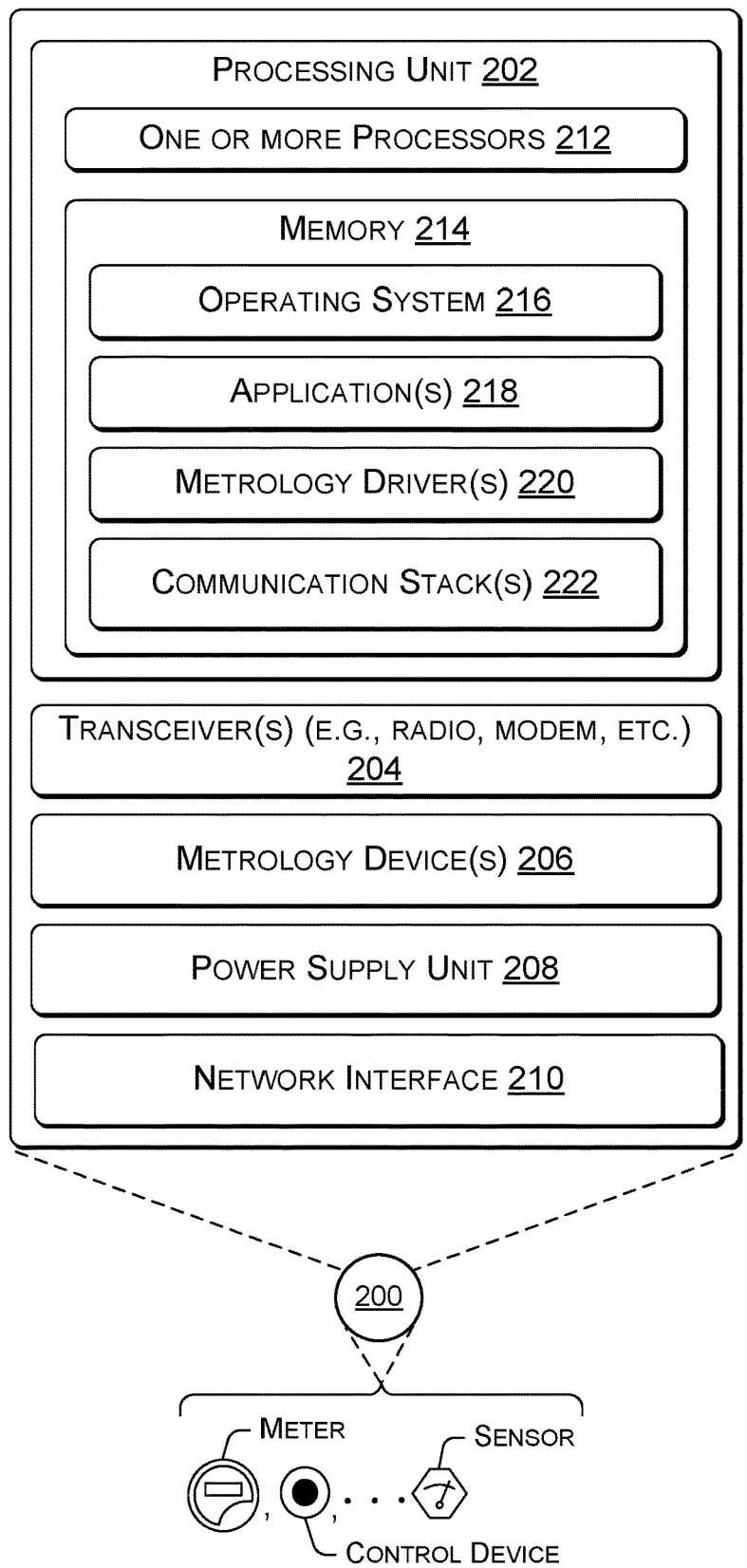
FIG. 2 is a diagram showing details of an example network communication device.

FIG. 2 is a diagram showing details of an example node 200, such as any of the network communication devices 102 and/or the network communication devices 104 of FIG. 1. The node 200 may comprise any type of network communication device (sometimes referred to as a node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, a computer systems in an automobile (e.g., navigation system), a camera, a robot, a hologram system, a security system, a home-based computer system (e.g., an intercom system, a home media system, etc.), a projector, an automated teller machine (ATM), and so on. In some examples, the node 200 is implemented as an edge device, such as a FAR, a cellular relay, a cellular router, an edge router, a DODAG (Destination Oriented Directed Acyclic Graph) root, a root device, and so on.

In some instances, the node 200 comprises a Limited Function Device (LFD), while in other instances the node 200 comprises a Full Function Device (FFD). An FFD may include more functionality/resources than an LFD, such as different processing powers, processing capabilities, power reliance, etc. In one example, an FFD is implemented as Mains Powered Device (MPD) that is connected to mains electricity (e.g., electricity meters), while an LFD is implemented as a Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life.

While FFDs and LFDs may have the similar components, the components may differ due to the different constraints. As one example, while both an FFD and an LFD have transceivers, the specific transceivers used may be different. For instance, a transceiver on an FFD may include a PLC modem, while a transceiver on an LFD does not because it is not connected to an electrical power line that could be used for PLC communications. Additionally, or alternatively, a transceiver on an LFD may employ a lower power RF radio than and FFD to minimize energy consumption. Further, other components of the FFDs and LFDs may vary. In some instances, an LFD is implemented with less functionality and/or include less hardware components than an FFD. Further, in some instances components of an LFD are lower power components than the corresponding components of an FFD.

In one example of the architecture 100 of FIG. 1, the nodes 102(1) and 104(1) each comprise an FFD, and the nodes 102(2)-102(N) and the nodes 104(2)-(M) each comprise an LFD. In another example, the nodes 102(1) and 104(1) each comprise an LFD, and the nodes 102(2)-102(N) and the nodes 104(2)-(M) comprise one or more LFDs and/or FFDs.

As shown in FIG. 2, the example node 200 includes a processing unit 202, a transceiver 204 (e.g., radio, modem, etc.), one or more metrology devices 206, a power supply unit 208, and a network interface 210. The processing unit 202 may include one or more processors 212 and memory 214. The one or more processors 212 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver 204 may comprise one or more hardware and/or software implemented radios to provide two-way RF communication with other network communication devices in an AN or another network. The transceiver 204 may additionally or alternatively include a modem to provide power line communication (PLC) communication with other network communication devices that are connected to an electrical service grid.

The metrology device(s) 206 may comprise the physical hardware and sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to a service provider via the transceiver 204 and/or the network interface 210. The consumption data may be formatted and/or packetized in a manner or protocol for transmission.

The power supply unit 208 may provide power to the node 200. In some instances, such as when the node 200 is implemented as a FFD, the power supply unit 208 comprises a mains power connector that couples to an Alternating Current (AC) or Direct Current (DC) mains power line where the node 200 is installed. In other instances, such as when the node 200 is implemented as a LFD, the power supply unit 208 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 214 includes an operating system (OS) 216 and one or more applications 218 that are executable by the one or more processors 212. The memory 214 may also include one or more metrology drivers 220 configured to receive, interpret, and/or otherwise process metrology data collected by the metrology device(s) 206. Additionally, or alternatively, the one or more applications 218 may be configured to receive and/or act on data collected by the metrology device(s) 206.

The memory 214 may also include one or more communication stacks 222. In some examples, the communication stack(s) 222 may be configured to implement a 6LowPAN protocol, an 802.15.4e (TDMA CSM/CA) protocol, an 802.15.4-2015 protocol, and/or another protocol. However, in other examples, other protocols may be used, depending on the networks with which the node 200 is intended to be compatible. The communication stack(s) 222 describe the functionality and rules governing how the node 200 interacts with each of the specified types of networks. For instance, the communication stack(s) 222 may cause network communication devices to operate in ways that minimize the battery consumption of the network communication devices when they are connected to these types of networks.

The memory 214 may also store other information. For example, the memory 214 may include a data structure that stores a member state indicating whether or not the node 200 is a member of a multicast group, a forwarding chain state indicating whether or not the node 200 is positioned on a forwarding chain for a multicast group, a pruning state indicating whether pruning is disabled or enabled for a multicast group, a child count of received subscriptions for a multicast group, a conscript state indicating whether or not the node 200 is acting as a bridge, information about sub-nodes or child nodes (e.g., subscriptions of child nodes to multicast groups, identifiers of multicast groups for sub-node or child nodes, any of the other information mentioned (but for a child node), etc.), identifiers of networks that have communicated with the network in which the node 200 is located, and so on.

In some instances, the node 200 may be configured to send or receive communications on multiple channels simultaneously. For example, the transceiver(s) 204 may be configured to receive data at the same time on hundreds of channels. Additionally, or alternatively, the transceiver(s) 204 may be configured to send data at the same time on hundreds of channels.

The various memories described herein (e.g., the memory 214) are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network communication devices (e.g., the node 200) are described herein, it should be understood that those network communication devices may include other components and/or be arranged differently. As noted above, in some instances a network communication device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing.

By way of example and not limitation, the node 200 may implement a variety of modulation techniques and/or data rates, such as frequency-shift keying (FSK) 802.15.4g (e.g., mandatory mode with a data rate of 50 kbps or 75 kbps, no forward error correction; legacy mode with a data rate of 150 kbps with forward error correction code rate ½; option 2; etc.), offset quadrature phase-shift keying (OQPSK) modulation with direct-sequence spread spectrum (DSSS) spreading, and so on. To implement these different connection modes, a media access control (MAC) sub-layer of a device may be able to indicate to a physical layer the modulation technique and data rate to be used for each transmission.

Example Point-to-Multipoint Sub-Tree (PST)

Figure 3A:
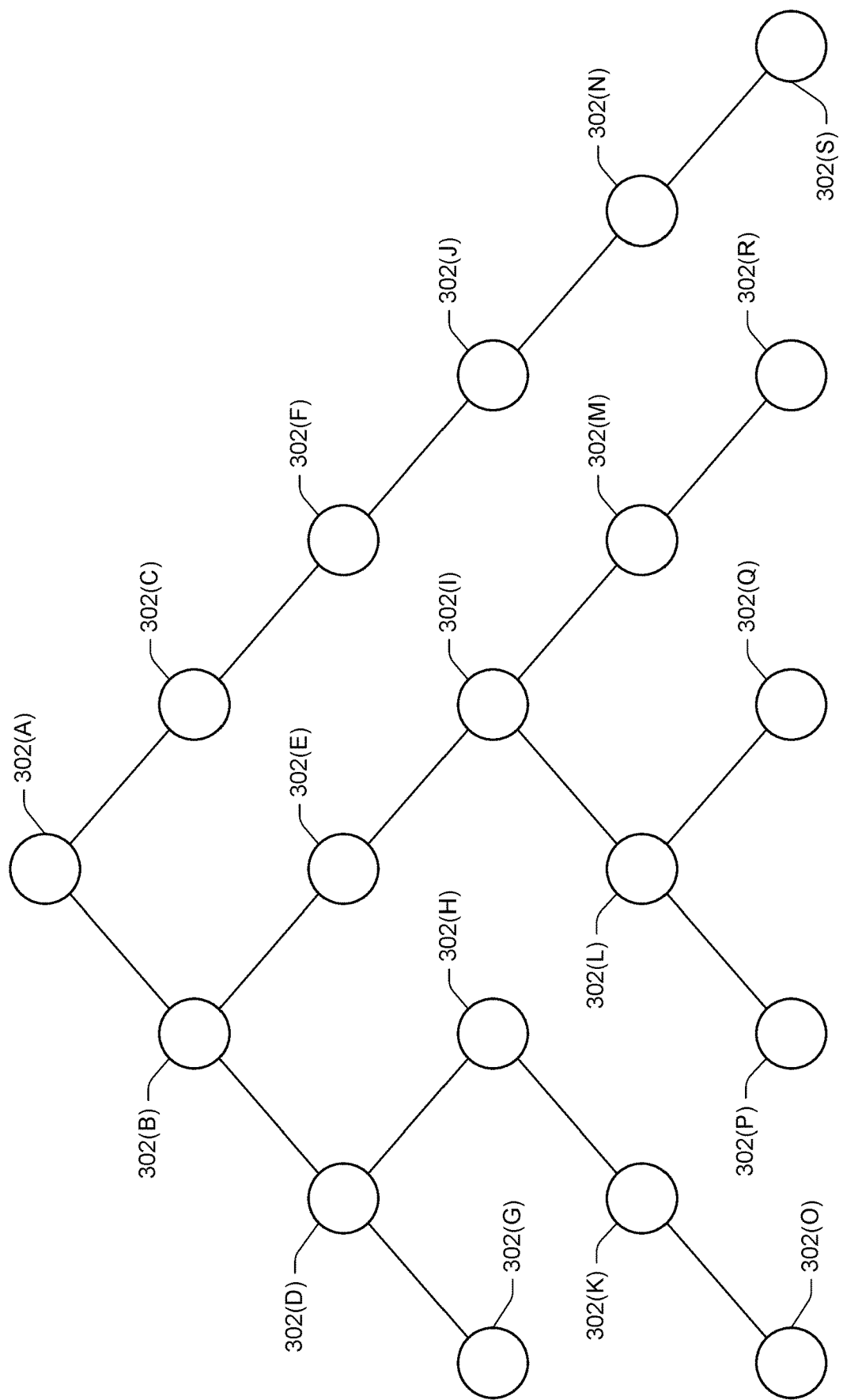
FIG. 3A illustrates an example network of nodes before formation of a Point-to-Multipoint Sub-Tree (PST).
Figure 3B:
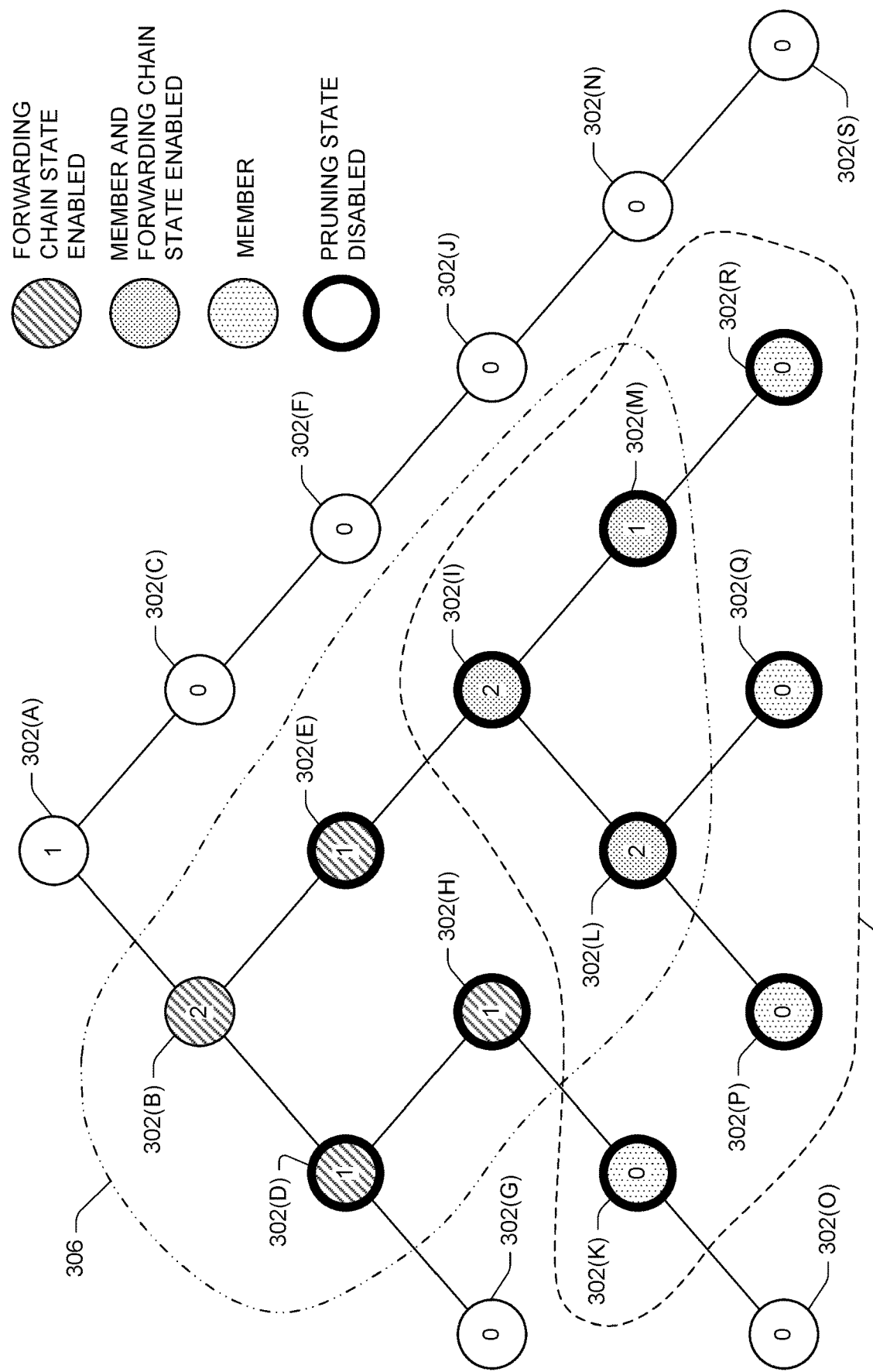
FIG. 3B illustrates an example network of nodes with indicators regarding a PST.

FIGS. 3A-3B illustrate formation of an example Point-to-Multipoint Sub-Tree (PST) for a multicast group. In particular, FIG. 3A illustrates a network of nodes 302(A)-(S) before formation of the PST, while FIG. 3B illustrates the network of nodes 302(A)-(S) with indicators regarding the PST. Here, the nodes 302(A)-(S) are configured in a Personal Area Network (PAN), although the nodes 302(A)-(S) may form other types of networks and/or be connected to other networks. Although many different multicast groups may be formed within a network, the example of FIGS. 3A-3B illustrate the formation of the PST for a single multicast group (e.g., nodes join the same multicast group). In a similar fashion, PSTs may be formed for other multicast groups. Further, in this example the nodes 302(A)-(S) are implemented in a Destination Oriented Directed Acyclic Graph (DODAG) with the node 302(A) being a DODAG root.

In this example, in referencing FIG. 3A, the node 302(P) is the first node to join a multicast group. The node 302(P) updates data to indicate that it is a member of the multicast group (e.g., sets its membership state to the multicast group to joined/enabled). The node 302(P) also sends a subscription message (sometimes referred to as a "subscribe message") to its parent, the node 302(L). The subscription message may be a Destination Advertisement Object (DAO) message or other message. The subscription message advertises that the node 302(P) is joining the multicast group. In many instances, the subscription message is sent as a unicast message. Although other forms of communication may be used, such as broadcast, multicast, etc.

The node 302(L) examines (e.g., views) the subscription message to see that the node 302(P) is subscribing to the multicast group. The node 302(L) updates its data to indicate the subscription of its child node, the node 302(P), to the multicast group. The node 302(L) also updates its forwarding chain state to indicate that the node 302(L) is along a forwarding chain to the root node 302(A). The node 302(L) also updates data indicating a number of different child nodes from which the node 302(L) has received a subscription message for the multicast group (also referred to as child count of received subscriptions). The child count of received subscriptions accounts for the number of different child nodes, not the number of subscriptions messages received. The node 302(L) then sends the subscription message on to its parent, the node 302(I).

The node 302(I) examines (e.g., views) the subscription message to see that the node 302(P) is subscribing to the multicast group. The node 302(I) also updates its child count of received messages for the multicast group and updates its forwarding chain state to indicate that the node 302(I) is along a forwarding chain to the root node 302(A).

A forwarding chain state may indicate whether or not a node is on a forwarding chain. When enabled, the forwarding chain state indicates that the node is part of a forwarding chain. When disabled, the forwarding chain state indicates that the node is not part of a forwarding chain.

This process is repeated for each node from parent-to-parent until the subscription message reaches the root node 302(A). In this example, the subscription message travels from the node 302(P) to the node 302(L), from the node 302(L) to the node 302(4 from the node 302(I) to the node 302(E), from the node 302(E) to the node 302(B), and from the node 302(B) to the root node 302(A). This path may be referred to as a forwarding chain for the node 302(P). Thus, each of the nodes 302(L), 302(I), 302(E), 302(B), and 302(A) has a forwarding chain state enabled. By sending the subscription message to the root node 302(A), the root node 302(A) may be aware of membership of its sub-nodes in multicast groups. In many instances, the subscription message may maintain its original format (except header/footer data) on its way to the root node 302(A). Although in other instances, the subscription message may be reformatted (e.g., data extracted and repackaged).

As noted above, as the subscription message traverses the network to the root node 302(A), data at each node is updated. In particular, each of the nodes in the forwarding chain (the nodes 302(L), 302(I), 302(E), 302(B), and 302(A)) will update its forwarding chain state to enabled for the multicast group (e.g., indicating that the respective node is along a forwarding chain for the multicast group). In addition, each of the nodes 302(L), 302(I), 302(E), 302(B), and 302(A) will update the child count of received subscriptions to 1 in this example. Note that the child count of received subscriptions is zero for the node 302(P). In this example, it is assumed that no previous subscription messages have been communicated before the communication of the subscription message for the node 302(P).

In addition to maintaining a forwarding chain state and a child count of received subscriptions, each node maintains other data. For example, each node maintains a pruning state for each multicast group. A pruning state may indicate whether or not to forward multicast data for a multicast group. The pruning state is initially enabled, meaning that data forwarding for the multicast group is not performed, generally. In other words, in the default state of pruning enabled, data will generally not be forwarded from the node. As such, in the example of FIG. 3A, the pruning state for each of the nodes 302 is initially enabled.

Although the nodes 302(B)-(S) do not generally maintain information about non-child nodes (e.g., the node 302(B) does not maintain information about a node two or more levels down, such as the node 302(H)), the root node 302(A) maintains information about membership of the nodes of its network. In other words, the root node 302(A) maintains data indicating membership of the nodes 302(B)-(S) in one or more multicast groups.

In continuing on in the example of FIGS. 3A-3B, the node 302(Q) next subscribes to the multicast group. The node 302(Q) changes its membership state for the multicast group to member and sends a subscription message to its parent, the node 302(L). The node 302(L) examines (e.g., views) the subscription message to see that the node 302(Q) is subscribing to the multicast group and updates its data to indicate the subscription of the node 302(Q) to the multicast group. The node 302(L) then forwards the subscription message on to its parent, the node 302(I), which updates its data. This process continues until the subscription message reaches the root node 302(A). Again, as the subscription message travels up the network, a forwarding chain is formed and data regarding a forwarding chain state and/or child count of received subscriptions is updated. Here, the subscription message travels along the nodes 302(L), 302(I), 302(E), 302(B), and 302(A).

At this point, the node 302(L) has received a subscription message from two child nodes, the node 302(P) and the node 302(Q). The node 302(L) has now become a common ancestor to the nodes 302(P) and 302(Q) (e.g., child count of subscription is greater than 1), since the node 302(L) joins two or more branches. When this occurs, the node 302(L) sends a message (e.g., MinP) to each of the child nodes 302(P) and 302(Q) instructing the respective node to disable the pruning state. In other words, the message instructs the respective node to change to a state in which data is forwarded from the respective node. The MinP message may be a DODAG Information Object (DIO) or another message. Upon receipt of the respective message, the node 302(P) and the node 302(Q) change the pruning state to disabled. This will allow multicast data that originates at, for example, the node 302(P) to be sent up to the node 302(L) and back down to the node 302(Q) (e.g., from one branch to another), or vice versa.

Next, the node 302(L) joins the multicast group. The node 302(L) changes its membership state for the multicast group to member and sends a subscription message to its parent, the node 302(I). The subscription message is sent node-by-node up the network until it reaches the root node 302(A). Again, as the subscription message travels up the network, a forwarding chain is formed and data regarding a forwarding chain state and/or child count of received subscriptions is updated. Here, the subscription message travels the nodes 302(I), 302(E), 302(B), and 302(A). At this point, the node 302(L) has enabled the forwarding chain state and the member state for the multicast group. Also, note that the node 302(I) has received multiple subscription messages, but all of those subscription messages have come from the node 302(L). Thus, the child count of received subscriptions for the node 302(I) is still 1. Each of the nodes 302(E), 302(B), and 302(A) also has a child count of received subscriptions of 1.

Next, the node 302(R) joins the multicast group. The node 302(R) changes its membership state for the multicast group to member and sends a subscription message to its parent, the node 302(M). The subscription message is sent node-by-node up the network until it reaches the root node 302(A). Again, as the subscription message travels up the network, a forwarding chain is formed and data regarding a forwarding chain state and/or child count of received subscriptions is updated. Here, the subscription message travels the nodes 302(M), 302(I), 302(E), 302(B), and 302(A).

Since the child count of received subscriptions for the node 302(I) has now changed to 2 (e.g., the node 302(I) is a common ancestor), the node 302(I) sends a message (e.g., MinP) to each of the child nodes 302(L) and 302(M) instructing the respective node to disable the pruning state. In addition, once the message to disable the pruning state is received at the node 302(M), the node 302(M) sends a message (e.g., MinP) to its child, the node 302(R), to disable its pruning state. Since the pruning states are already disabled in the child nodes for the node 302(L) (e.g., the nodes 302(P) and 302(Q)), the node 302(L) does not need to send a message to its child nodes to disable the pruning state.

In this example, the node 302(K) joins the multicast group next. The node 302(K) changes its membership state for the multicast group to member and sends a subscription message to its parent, the node 302(H). The subscription message is sent node-by-node up the network until it reaches the root node 302(A). Again, as the subscription message travels up the network, a forwarding chain is formed and data regarding a forwarding chain state and/or child count of received subscriptions is updated. Here, the subscription message travels the nodes 302(H), 302(D), 302(B), and 302(A).

The child count of received subscriptions for the node 302(B) has now changed to 2 and the node 302(B) is now a common ancestor. In particular, the node 302(B) has received at least one subscription message from the node 302(E) and also at least one subscription message from the node 302(D).

A subscription message does not need to indicate a subscription for a direct child node to count towards the child count of received subscriptions. For example, the subscription message for the node 302(K) to join the multicast group, which is sent up to the node 302(B) through intermediary nodes, counts toward the child count of received subscriptions for the node 302(B), even though the subscription message is for a node that it several levels down. In addition, the various subscription messages received by the node 302(B) from the node 302(E) for nodes within that sub-tree, cause the child count of received subscriptions for the node 302(B) to be incremented by just one, since the subscription messages were all received from the same child, the node 302(E). As such, the child count of received subscriptions accounts for the number of different child nodes, not the number of subscriptions messages received.

When the node 302(B) becomes a common ancestor, the node 302(B) sends a message (e.g., MinP) to each of the child nodes 302(D) and 302(E) instructing the respective node to disable the pruning state. The message may be sent as either a unicast to each child node or a multicast to all neighboring nodes of the node 302(B). In many instances, such message will only be processed if it is received from the node's PST parent (e.g., the node to which it sends its subscribe messages).

Upon receiving the message, the node 302(D) sends a message (e.g., MinP) to its child, the node 302(H) to disable the pruning state. Then, upon receipt of such message at the node 302(H), the node 302(H) sends a message (e.g., MinP) to its child, the node 302(K), to disable the pruning state. The node 302(D) does not need to send such a message to the child node 302(G), since it knows that the child node 302(G) is not a member of the multicast group or part of a forwarding chain. Similarly, in the other branch, upon receipt of the message at the node 302(E), the node 302(E) sends a message (e.g., MinP) to its child, the node 302(I), to disable the pruning state. The child nodes to the node 302(I) have already disabled the pruning state and so a message to disable the pruning state is not further distributed along that sub-tree. By disabling the pruning states of the nodes 302(K), 302(H), 302(D), 302(E), and 302(I), the techniques may allow multicast data in one branch to reach the other branch.

Here, the nodes 302(M) and 302(I) similarly join the multicast group by changing a membership state for the multicast group to member and sending a subscription message up the network to the root node 302(A). A forwarding chain for each of the nodes 302(M) and 302(I) is formed as the respective subscription message is forwarded up to the root node 302(A).

FIG. 3B illustrates the example PST that has been formed. As illustrated with light stippling, the nodes 302(K), 302(P), 302(Q), and 302(R) are members of the multicast group. As illustrated with dense stippling, the nodes 302(I), 302(L), and 302(M) are both members of the multicast group and have the forwarding chain state enabled. Thus, a group 304 includes the members of the multicast group. As illustrated with dashed lines, the nodes 302(B), 302(D), 302(E), and 302(H) have the forwarding chain state enabled for the PST. Thus, a group 306 includes nodes that act as relays for multicast data (e.g., they relay or forward multicast data). Although not shown in this example, in some instances the root node 302(A) also has a forwarding chain state enabled.

In FIG. 3B, each of the nodes 302(A)-(S) shows a child count of received subscriptions in the middle of the respective node. Further, the nodes with the pruning state disabled are shown with a darker outline (i.e., the nodes 302(D), 302(E), 302(H), 302(I), 302(K), 302(L), 302(M), 302(P), 302(Q), and 302(R)).

This PST may allow data to be forwarded along paths that lead to members of the multicast group. Multicast data may generally be forwarded from a node (either upwards or downwards in the network) if at least one of the following conditions is satisfied: (i) the node is set to a state in which data is forwarded from the node for the multicast group (e.g., the pruning state is disabled), or (ii) the node has received a subscription message for the multicast group from two or more different child nodes (e.g., the child count of received subscriptions is two or greater—the node is a common ancestor).

In the example of FIGS. 3A-3B, any member of the multicast group may initiate multicast data for members of the multicast group. That is, the multicast group comprises an anycast group where each member of the multicast group is configured to initiate a multicast communication.

To illustrate distribution of data in the example of FIG. 3B, assume that the node 302(R) desires to send data to all members of the multicast group. The node 302(R) will transmit the data. The data can be received by all neighboring nodes. Here, the data is received by the node 302(M). The node 302(M) will then transmit the data, since its pruning state is disabled. The node 302(I) will hear and receive the transmission. The node 302(I) will then transmit the data, since its pruning state is disabled. The nodes 302(E) and 302(L) will each hear and receive the transmission. The node 302(L) will transmit the data (since its pruning state is disabled), which is heard and received by the nodes 302(P) and 302(Q). Further, the node 302(E) will transmit the data upon receiving the transmission from the node 302(I). The node 302(E) will transmit the data since its pruning state is disabled. The transmission may be heard and received by the node 302(B). The node 302(B) will transmit the data, since the node 302(B) has a child count of received subscriptions of 2. This will occur even though the pruning state for the node 302(B) is enabled. The transmission is heard and received by the node 302(D). The node 302(D) then transmits the data, which is heard and received by the node 302(H). The node 302(H) may transmit the data (since its pruning state is disabled), which is heard and received by the node 302(K). As such, data is forwarded if the node has the forwarding chain state enabled and the pruning disabled, or if the node is a common ancestor (e.g., child count of received subscriptions is greater than 1). In this illustration, data is limited to being distributed within a particular sub-tree of the network (e.g., a sub-tree rooted at the node 302(B)).

In this illustration, the node 302(A) may receive the multicast data from the node 302(B) (e.g., if the data is transmitted as a multicast transmission). However, the node 302(A) will not forward on the multicast data, since the pruning state is disabled and the child count of received subscriptions is 1. This limits the multicast data from being distributed down into the branch of the node 302(C). Further, the node 302(G) may hear the multicast data transmitted by node 302(D), but this data may be disregarded by the node 302(G), since it is neither a member of the multicast group nor forwarding for this multicast group. Similarly, the multicast data may be heard by the node 302(O) where it would be disregarded.

Although not illustrated in FIGS. 3A-3B, a message (e.g., MinP) to disable a pruning state may be sent in other instances than those described above. In one example, a node that is a member-in-path (also referred to as a member ancestor) may send a message to a child node to disable a pruning state. In returning to the state described above in FIG. 3A when there only two members of the multicast group (the node 302(P) and the node 302(Q)), let's assume that the node 302(E) becomes the next member of the multicast group. Here, the node 302(E) determines that is it part of a forwarding chain for a member of the multicast group (e.g., it is along a forwarding chain for the node 302(P) and the node 302(Q)). Further, the node 302(E) is now a member. As such, the node 302(E) is a member ancestor to the member nodes 302(P) and 302(Q). In other words, the node 302(E) is a member along a path to the root node 302(A). The node 302(E) should now be included in multicast communications. As such, the node 302(E) sends a message to its child, the node 302(I), instructing the node 302(I) to disable the pruning state. This causes the node 302(I) to send a message to its child, the node 302(L), to disable the pruning state. Such message is not sent to the node 302(M), since it is not part of a forwarding chain. Thus, pruning states are disabled along the forwarding chains. In this illustration, by disabling the pruning states of the node 302(I) and 302(L), multicast data may be distributed among the members of the multicast group (the nodes 302(P), 302(Q), and 302(E)) via the nodes 302(L) and 302(I).

Furthermore, although the example of FIGS. 3A-3B show the formation of a PST with particular nodes, the PST may be formed with any number of nodes and/or dynamically updated over time. For example, as nodes subscribe or unsubscribe to the multicast group, the PST may be updated so that data forwarding is limited in a different manner.

Example Network Bridging

Figure 4A:
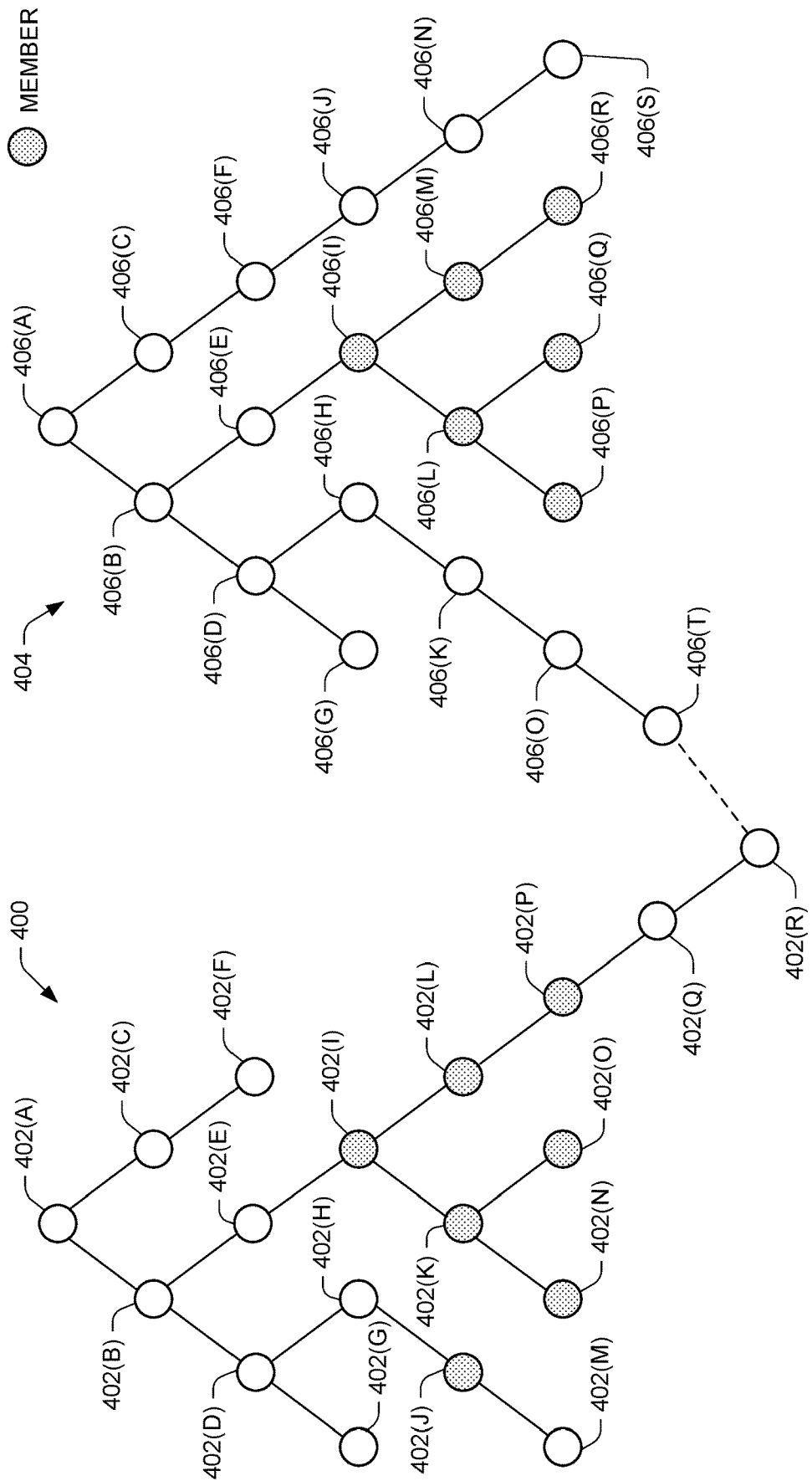
FIG. 4A illustrates example networks before a communication bridge has been established.
Figure 4B:
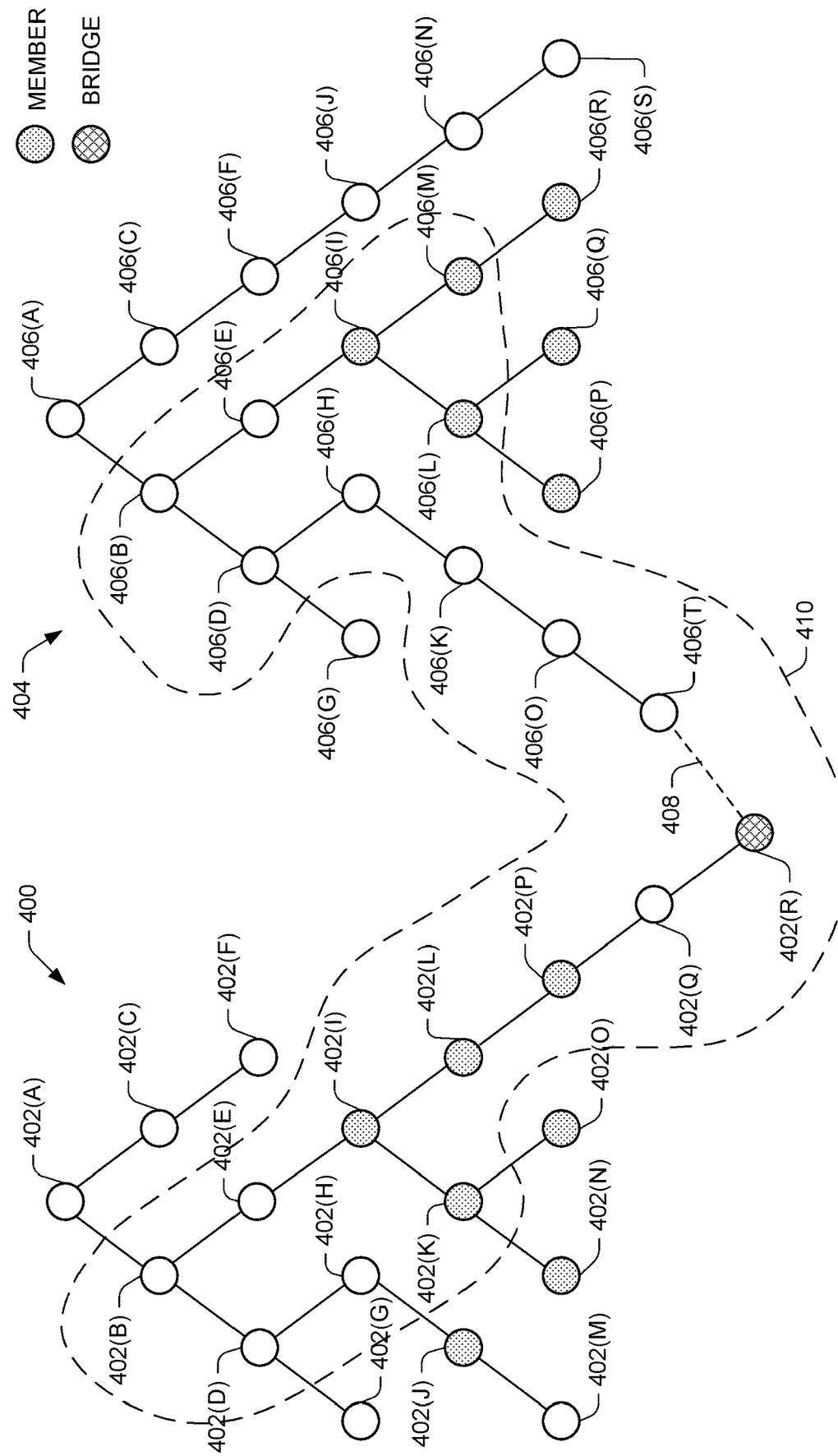
FIG. 4B illustrates example networks after establishing a communication bridge.

FIGS. 4A-4B illustrate an example of bridging communication between networks to facilitate distribution of multicast data. FIGS. 4A-4B illustrate a network 400 having nodes 402(A)-402(R) (collectively referred to as "nodes 402") and a network 404 having nodes 406(A)-406(T) (collectively referred to as "nodes 406"). In particular, FIG. 4A illustrates the networks 400 and 404 before a communication bridge has been established, while FIG. 4B illustrates the networks 400 and 404 after establishing the communication bridge. Here, the networks 400 and 404 are Personal Area Networks (PANs), although the networks 400 and 404 may be other types of networks. Further, in this example, the networks 400 implements a DODAG with the node 402(A) being a DODAG root, and the network 404 implements a DODAG with the node 406(A) being a DODAG root.

In reference to FIG. 4A, as the nodes 402 join the network 400, the nodes 402 may send messages up the network 400 to the root node 402(A) indicating such subscription to the network 400. In some instances, the messages are DAO messages, while in other instances the messages are other types of messages. If a node is able to communicate with a node of another network, a message may be sent from the node up through the other network to the root node of the other network. In the example of FIGS. 4A-4B, the node 402(R) joins the network 400. Further, the node 402(R) is able to communicate with the node 406(T) (e.g., the node 406(T) could have been selected as a parent). Here, the node 402(R) may send a message (also referred to as a membership message) to the node 406(T) indicating that the node 402(R) has become a member of the network 400 (e.g., a message with a source address identifying the network 400). The message may traverse the network 404 to the root node 406(A).

In a similar fashion, as the nodes 406 join the network 404, the nodes 406 may send messages up the network 404 to the root node 406(A) indicating such membership to the network 404. In some instances, the messages are DAO messages, while in other instances the messages are other types of messages. As noted above, in this example the nodes 402(R) and 406(T) are able to communicate with each other. Thus, the node 406(T) also sends a message to the node 402(R) indicating membership of the node 406(T) to the network 404. This message traverses the network 400 up to the root node 402(A).

In this example, the node 402(R) may send a membership message up to the node 406(A) of the adjacent network 404, and/or the node 406(T) may send a membership message up to the node 402(A) of the adjacent network 400. In other examples, a node may send a message to a root node of its network indicating that it is able to communicate with a node of an adjacent network. For example, the node 402(R) may generate a message and send such message up to its root node 402(A) indicating that it is able to communicate with a node of the network 404.

Further, as the nodes 402(J), 402(I), 402(K), 402(L), 402(N), 402(O), and 402(P) become members of a multicast group, the nodes 402(J), 402(I), 402(K), 402(L), 402(N), 402(O), and 402(P) may send membership messages through the network 400 node-by-node to the root node 402(A). In some instances, the membership messages are DAO messages, while in other instances the membership messages are other types of messages. Likewise, as the nodes 406(I), 406(L), 406(M), 406(P), 406(Q), and 406(R) become members of the same multicast group, the nodes 406(I), 406(L), 406(M), 406(P), 406(Q), and 406(R) may send subscription messages through the network 404 node-by-node to the root node 406(A).

Based on receipt of various messages, the root node 402(A) may maintain a list of networks that have communicated with the network 400 and/or a list of multicast groups associated with the network 400. In this example, the list of networks that have communicated with the network 400 may include the network 404 (e.g., a network identifier for the network 404). Further, the list of multicast groups may include the multicast group that the nodes 402(J), 402(I), 402(K), 402(L), 402(N), 402(O), and 402(P) are members of (e.g., a multicast identifier or address for the multicast group). The root node 402(A) may send the list of networks and/or the list of multicast groups to a central agent, such as the service provider 106 of FIG. 1.

Meanwhile, based on receipt of various messages, the root node 406(A) may maintain a list of networks that have communicated with the network 404 and/or a list of multicast groups associated with the network 404. In this example, the list of networks that have communicated with the network 404 may include the network 400. Further, the list of multicast groups may include the same multicast group that its sub-nodes are members of. The root node 406(A) may send the list of networks and/or the list of multicast groups to the central agent.

The central agent may process the information received from the root node 402(A) and the information from the root node 406(A) to determine a plurality of networks that are needed to bridge communication for the multicast group. Each network of the plurality of networks may be adjacent to at least one other network of the plurality of networks. In other words, the plurality of networks may be a chain of adjacent networks that are needed to distribute data to members of the multicast group. In this example, the central agent determines that the networks 400 and 404 need to be bridged for the multicast group.

The central agent may then determine a bridge list for one or more networks, such as each network or a particular number of networks. The bridge list may indicate adjacent networks of the plurality of networks that a particular network needs to connect to in order to facilitate distribution of multicast data. In this example, the central agent determines a bridge list for the network 400. This bridge list includes the network 404 (e.g., a network identifier for the network 404).

Although the central agent may instruct either or both of the networks 400 and 404 to bridge communication for the multicast group, in this example the central agent instructs the network 400, since the root node 402(A) received a message indicating that a node from its network is able to communicate with a node from the network 404. In particular, the central agent sends a message to the root node 402(A) with the bridge list for the multicast group to bridge to the network 400. In other words, the central agent requests that the network 400 bridge communication to the network 404 for the multicast group.

Upon receipt of such message, the root node 402(A) may select a node to act as the bridge between the networks 400 and 404. The root node 402(A) may generally select a node that has communicated with a node from the network 404 in the past. In this example, the root node 402(A) selects the node 402(R) to act as the bridge (also referred to as a "conscript"). The root node 402(A) may send a message through the network 400 to the node 402(R) requesting that the node 402(R) bridge communication to the network 404. In some instances, the message is sent in a DIO communication, while in other instances the message is sent in other formats.

The node 402(R) is then configured to bridge communication between the networks 400 and 404, as illustrated in FIG. 4B. In this example, this includes configuring the node 402(R) to act as a virtual member of the multicast group. In general, a virtual member of a multicast group performs operations like a member of the multicast group, but without processing multicast data for the multicast group, as discussed in further detail below. To become a virtual member, the node 402(R) may send a subscription message up the network 400 to the root node 402(A) indicating that the node 402(R) is joining the multicast group as a virtual member. The node 402(R) may also send, via a link 408, a subscription message to the node 406(T) of the network 404 indicating that the node 402(R) is joining the multicast group as a virtual member. This subscription message may traverse the network 404 to reach the root node 406(A).

As the subscription message is sent up the network 400 and up the network 404, a portion of a PST may be formed for the multicast group. For example, the node 406(B) may become a common ancestor after the subscription message is sent up to the root node 406(A). This causes the node 406(B) to send a message to the child nodes 406(D) and 406(E) to disable a pruning state. The message to disable a pruning state may propagate down the nodes from the node 406(D) to the node 406(R) to disable a pruning state in each of these nodes. Further, after sending the subscription message up to the root node 402(A), the node 402(R) now has a member in its path to the root node 402(A) (e.g., a member along the forwarding chain). This cause the node 402(P) to send a message to the node 402(Q) to disable a pruning state.

As illustrated in FIG. 4B, a group of nodes 410 may be relays for the multicast group. In other words, these nodes may assist in distributing multicast data for the multicast group to all members of the multicast group in both the network 400 and the network 404. The node 402(R) may act as the bridge between the network 400 and the network 404.

Although the example of FIGS. 4A-4B discusses the root node 402(A) communicating with the node 402(R) to become the bridge, in some instances the network 404 may facilitate such processing. For example, the root node 406(A) may send a message to the node 406(T) instructing the node 406(T) to communicate with the node 402(R) to cause the node 402(R) to become the bridge.

Example Processes

Figure 5:
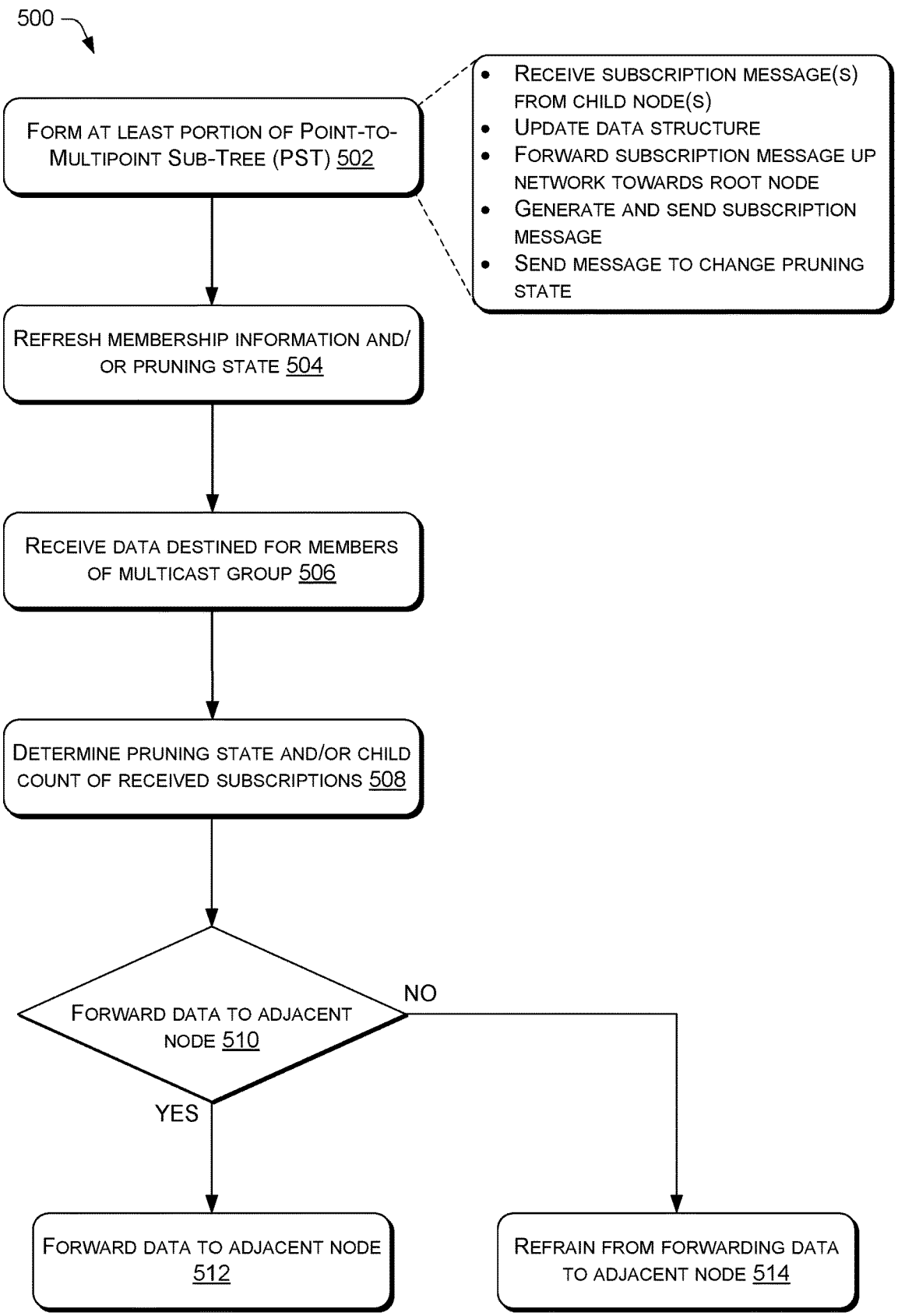
FIG. 5 illustrates an example process to form a PST and/or distribute data according to the PST.
Figure 6A:
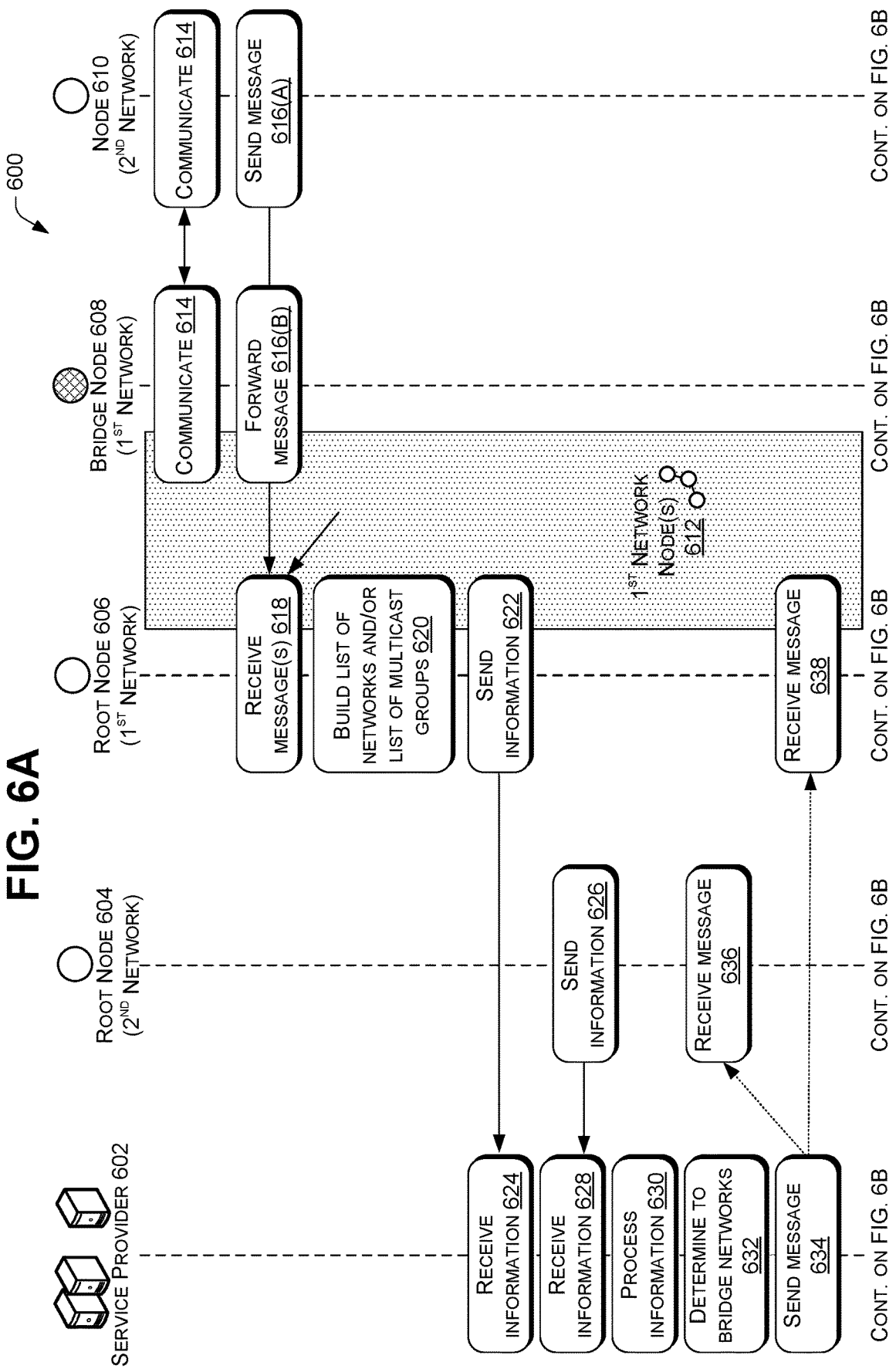
FIGS. 6A-6B illustrate an example process to bridge communication between multiple networks to facilitate distribution of multicast data.
Figure 6B:
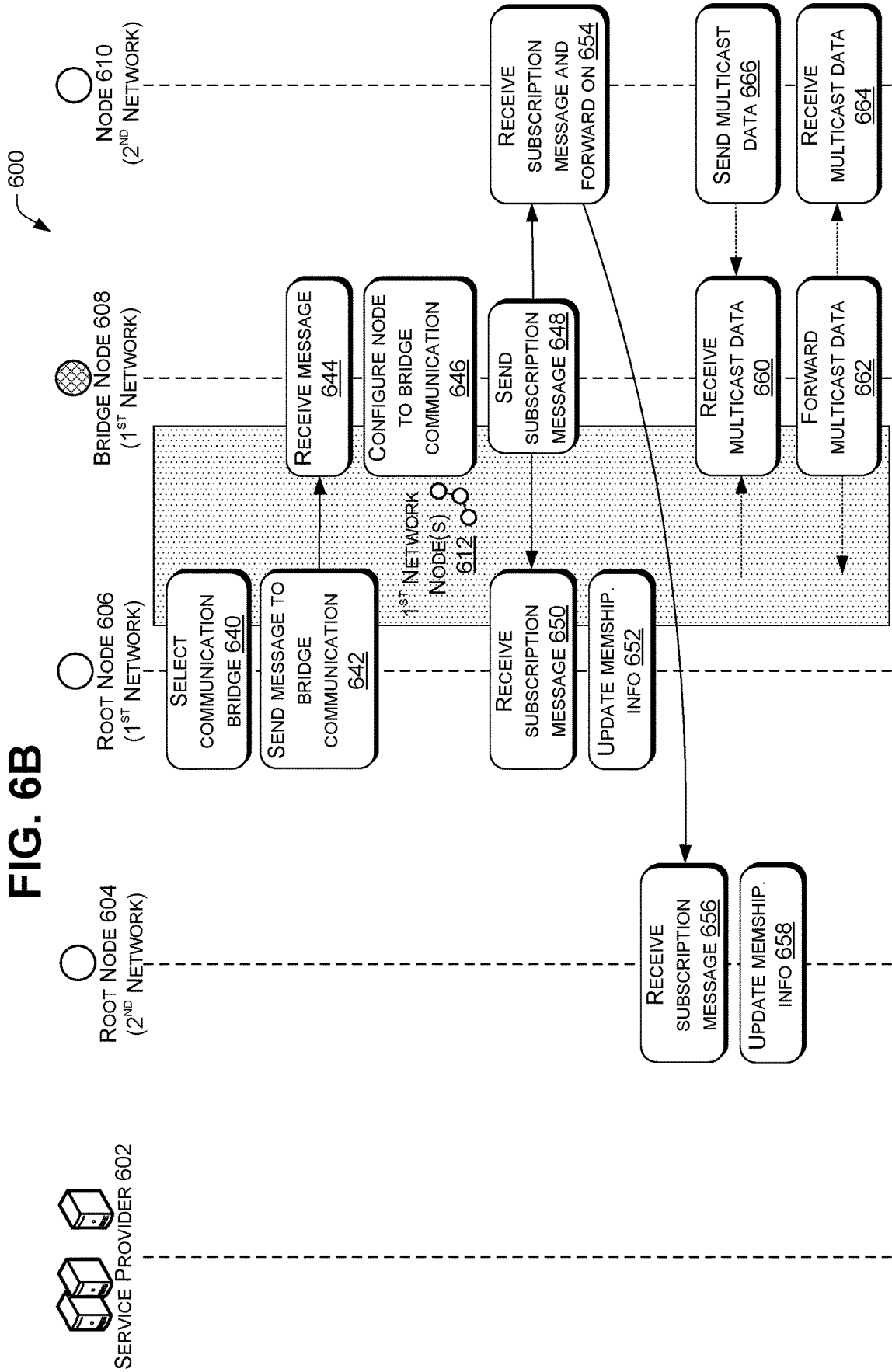

FIGS. 5 and 6A-6B illustrate example processes 500 and 600 for employing the techniques discussed herein. For ease of illustration the processes 500 and 600 may be described as being performed by various devices discussed herein. However, the processes 500 and 600 may be performed by any type of device, such as the service provider 106, the node 200, or any other device.

The processes 500 and 600 (as well as each process described herein) are illustrated as logical flow graphs, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

FIG. 5 illustrates the example process 500 to form a Point-to-Multipoint Sub-Tree (PST) and/or distribute data according to the PST.

At 502, the node 200 may form at least a portion of the PST. This may include performing a variety of operations. In one example, the node 200 receives, from a child node, a subscription message advertising membership to the multicast group. The subscription message may indicate that the child node is subscribing to the multicast group and/or that a node along a branch including the child node is subscribing to the multicast group. The node 200 may view the subscription message and update a data structure. The data structure may maintain a child count of received subscriptions, subscription information for the node 200 (e.g., what multicast groups the node 200 is a member of), subscription information for other nodes (e.g., what multicast groups the sub-nodes to the node 200 are members of), a pruning state of the node 200 (e.g., enabled or disabled), a forwarding chain state of the node 200 (e.g., enabled or disabled), and so on. The node 200 may forward the subscription message up the network to a parent node (e.g., a node that is fewer hops to a root node than the node 200), so that the subscription message may reach a root node. This may form a forwarding chain for the node that originated the subscription message. In another example, the node 200 may generate a subscription message itself and send that message up the network to a parent node.

In yet another example, the node 200 may form a portion of the PST by sending a message to a child node to change a pruning state of the child node. In one illustration, the node 200 may send a message (e.g., MinP) to change a pruning state when the node 200 becomes a common ancestor. Here, the node 200 may have received a subscription message from a first child node advertising membership to the multicast group and a subscription message from a second child node advertising membership to the multicast group. The node 200 may update the child count of received subscriptions to 2 and determine that the node has received a subscription message for the multicast group from two or more different child nodes (e.g., the child count of received subscriptions is more than a threshold). Based on such determination, the node 200 may send a message to the first child node and/or the second child node instructing the respective child node to disable a pruning state to allow data forwarding from the child node for the multicast group. In another illustration, the node 200 may send a message to change a pruning state when the node 200 is a member-in-path for the multicast group. Here, the node 200 may determine that it has transitioned to being a member of the multicast group and that the node 200 is part of a forwarding chain for a member of the multicast group. Alternatively, or additionally, the node 200 may determine that it is a member of the multicast group and that a sub-node has transitioned to being a member of the multicast group (e.g., the node 200 is now a member-in-path). Based on either determination, the node 200 may send a message to a child node to disable a pruning state. The message may traverse downward along a forwarding chain to allow data forwarding for the multicast group for nodes along the forwarding chain.

At 504, the node 200 may refresh membership information and/or a pruning states. The operation 504 may be performed to deal with network topology changes (e.g., nodes joining or leaving the network). For example, periodic subscription messages may be sent by the node 200 to a parent node (e.g., its best parent) to announce its membership to a multicast group. Additionally, or alternatively, the node 200 may periodically send a message to a child node to disable or enable a pruning state of the child node.

At 506, the node 200 may receive data destined for members of a multicast group. The data may be received from a child node, a parent node, or any other neighboring node (e.g., direct neighbor).

At 508, the node 200 may determine a pruning state of the node 200 and/or a child count of received subscriptions. For example, the node 200 may determine if the pruning state is enabled for the multicast group or if the pruning state is disabled. Additionally, or alternatively, the node 200 may determine a number of different child nodes from which the node 200 has received a subscription to the multicast group (e.g., the child count of received subscriptions).

At 510, the node 200 may determine whether or not to forward the data to an adjacent node. That is, the node 200 may determine whether or not it needs to forward the data to propagate the data to one or more members of the multicast group. For example, the node 200 may determine to forward the data when the pruning state is disabled for the node 200 and/or the node 200 has received at least a subscription message for the multicast group from a first child node and a subscription message for the multicast group from a second child node (e.g., the child count of received subscriptions is greater than 1). Alternatively, the node 200 may determine to not forward the data when the pruning state is enabled for the node 200 and the node 200 has not received at least a subscription message for the multicast group from a first child node and a subscription message for the multicast group from a second child node (e.g., the child count of received subscriptions is less than 2).

If the node 200 determines to forward the data to the adjacent node, the process 500 may proceed to operation 512 (e.g., the YES branch). If the node determines to not forward the data to the adjacent node, the process 500 may proceed to operation 514 (e.g., the NO branch).

At 512, the node 200 may forward the data to the adjacent node. This includes transmitting the data, which may be heard and/or received by any neighboring nodes (e.g., an adjacent node). The adjacent node may be a neighboring node that is a child, parent, or another node. The adjacent node may be a member of the multicast group. Alternatively, the adjacent node may not be a member of the multicast group.

At 514, the node 200 may refrain from forwarding the data to the adjacent node.

FIGS. 6A-6B illustrate the example process 600 to bridge communication between multiple networks to facilitate distribution of multicast data. For ease of discussion, the process 600 is illustrated as being performed by various devices, such as a service provider 602 (like the service provider 106 of FIG. 1), a root node 604 of a second network, a root node 606 of a first network, a bridge node 608 of the first network, and a node 610 of the second network. In many instances, the service provider 602 implements a central agent to bridge communication between networks.

In FIGS. 6A-6B, a first network of node(s) 612 is illustrated between the root node 606 and the bridge node 608. This represents one or more nodes of the first network. For example, communications between the root node 606 and the bridge node 608 may generally occur via the first network of node(s) 612 (e.g., node-by-node through the first network). However, in other instances the first network of node(s) 612 is eliminated and the root node 606 and the bridge node 608 communicate directly with each other.

In FIG. 6A, at 614, the bridge node 608 and the node 610 may communicate. This may include sending and/or receiving any number of communications to discover each other. For example, the bridge node 608 and/or the node 610 may send a message (e.g., broadcast) to neighboring nodes to discover other proximate nodes and/or form a parent-child relationship. Based on such communication, the bridge node 608 and/or the node 610 may join a network (e.g., form a parent-child relationship with a node of a network). During this process, the bridge node 608 and the node 610 discover that they are within communication range of each other, but ultimately the bridge node 608 joins the first network and the node 610 joins the second network.

At 616(A), the node 610 may send a message to the bridge node 608, and at 616(B), the bridge node 608 may forward that message on to the root node 606. The message may indicate membership of the node 610 to the second network. The message may include a network identifier (e.g., PAN identifier) of the second network. In some instances, the message is sent in a DAO communication, while in other instances the message is sent in other types of communications. As such, the message may indicate that the node 610 has communicated with the bridge node 606 and/or that the bridge node 608 could potentially be a parent to the node 610. By sending such message into a neighboring network (i.e., the second network), the root node 606 of the neighboring network may identify adjacent networks.

Although not illustrated in FIG. 6A, the node 610 may also send a message to the root node 604 of its own network, the second network. The message may indicate membership of the node 610 to the second network.

Further, although also not illustrated in FIG. 6A, the bridge node 608 may similarly send a message up to the root node 606 of the first network and a message up to the root node 604 of the second network. Each message may indicate a membership of the bridge node 608 to the first network.

At 618, the root node 606 may receive the message originating from the node 610. The root node 606 may also receive one or more subscription messages from the first network node(s) 612 (or the bridge node 608) indicating subscription of the first network node(s) 612 (or the bridge node 608) to one or more multicast groups. The root node 606 may receive subscription messages over time as nodes subscribe to one or more multicast groups.

At 620, the root node 606 may build a list of networks that have communicated with the first network and/or a list of multicast groups that have members in the first network. For example, upon receiving the message originating from the node 610 and identifying the second network, the root node 606 may update the list of networks to indicate that a node of the first network has received a communication from a node of the second network. Here, a network identifier for the second network may be included in the list of networks. In another example, upon receiving a subscription message indicating that a particular node is subscribing to a multicast group, the root node 606 may update the list of multicast groups for the first network to indicate that the particular node is a member of the multicast group. Here, a multicast group identifier (e.g., multicast group address) may be included in the list of multicast groups. As such, as part of operation 620, the root node 606 may determine that a node of the first network has communicated with a node of the second network and/or that the first network includes a member of a particular multicast group.

At 622, the root node 606 may send information to the service provider 602. The information may include the list of networks and/or the list of multicast groups.

At 624, the service provider 602 may receive the information from the root node 606.

At 626, the root node 604 of the second network may send information to the service provider 602, and at 628, the service provider 602 may receive the information. The information may include a list of networks that have communicated with the second network and/or a list of multicast groups that have members in the second network. Such information may have been created at the root node 604 in a similar fashion as that done at operation 620 (e.g., as messages are received indicating subscriptions and/or communication with other networks).

At 630, the service provider 602 may process the information received from the root node 604 and the information received from the root node 606. For example, the service provider 602 may analyze the lists of multicast groups received from the root nodes 604 and 606 to build, for each multicast group, a list of networks that include at least one member of the respective multicast group. The service provider 602 may also analyze the lists of networks received from the root nodes 604 and 606 to determine a plurality of networks that are needed to bridge communication to a list of networks that include at least one member for a particular multicast group. Each network of the plurality of networks may be adjacent to at least one other network of the plurality of networks. In other words, the plurality of networks may be a chain of adjacent networks that are needed to distribute data to members of the particular multicast group. The service provider 602 may then determine a bridge list for a particular network. The bridge list may indicate adjacent networks of the plurality of networks that the particular network needs to connect to in order to facilitate distribution of multicast data. This process may be repeated for each multicast group.

In one illustration, assume network A has a member in a multicast group and is adjacent to network B that also has a member in the same multicast group. The bridge list for the network A for the multicast group would include the network B, and the bridge list for the network B for the multicast group would include the network A.

In another illustration, assume that network Q is adjacent to network R, and network R is adjacent to network S. Also, assume that only networks Q and S include members in the same multicast group. Here, the network Q would need to bridge to the network R, and the network R would need to bridge to the network S in order to form a path of distribution. Thus, the networks Q, R, and S are needed to bridge communication. As such, the bridge list for the network Q would include the network R, even though the network R does not include a member of the multicast group. Further, the bridge list for the network R would include the networks Q and S, and the bridge list for the network S would include the network R.

Although the operation 630 is discussed in the context of creating a bridge list for each network of a plurality of networks that are needed to bridge communication for a multicast group, in some instances a limited number of bridge lists are created, such as those needed to form sufficient bridges to connect the plurality of networks. For example, in returning to the illustration above with the networks Q, R, and S, the bridge list for the network R may be the only bridge list that is created, since the network R is able to connect to both the networks Q and S (e.g., it's an intermediary network).

At 632, the service provider 602 may determine to bridge communication between multiple networks for a multicast group to allow distribution of multicast data to members of the multicast group. The determination may be based on the processing at operation 630. For example, the service provider 602 may determine to bridge the first network and the second network for a multicast group when the first network and the second network each have at least one member to the multicast group. In some instances, the service provider 602 may determine to bridge communication for adjacent networks that include members in the same multicast group. In other instances, the service provider 602 may determine to bridge communication for networks that include members in the same multicast group, but are not adjacent networks. Here, the service provider 602 may determine to use an intermediary network without members in a multicast group.

At 634, the service provider 602 may send a message to the root node 604 and/or the root node 606. The message may request that communication be bridged with another network for a multicast group to allow distribution of multicast data to members of the multicast group. The message may include a bridge list for a multicast group. Although operation 634 is illustrated as sending a message to the root node 604 and the root node 606, in many instances the message is sent to only one of the root nodes. This may avoid duplicative processing at the root nodes to configure a node to bridge communication and/or reduce duplicate multicast data at some nodes.

In the example illustrated in FIG. 6A, the first network and the second network are adjacent to each other and each include at least one member in the same multicast group. Here, the service provider 602 sends a message to either the root node 604 and/or the root node 606 requesting that communication be bridged between the first and second networks for the multicast group. The service provider 602 may send a bridge list to the root node 604 and/or the root node 606. For instance, if the message is sent to the root node 606, the bridge list for the multicast group for the root node 606 would list the second network (e.g., list the network identifier for the second network).

In another example, not illustrated in FIG. 6A, assume that the first network and the second network are not adjacent to each other, but a third network is positioned between the two. Also, assume that the first network and the second network include members in the same multicast group, but the third network does not. Here, the service provider 602 may send a message to any of the root nodes requesting that communication be bridged for the multicast group. For instance, the message may be sent to the root node of the third, intermediary network with the bridge list for the multicast group. The bridge list may list the first network and the second network.

At 636, the root node 604 may receive the message from the service provider 602 regarding a communication bridge between networks for a multicast group.

Alternatively, or additionally, at 638, the root node 606 may receive the message from the service provider 602 regarding a communication bridge.

The example of FIGS. 6A-6B focuses on the root node 606 receiving the message and performing processing based on such receipt, as discussed below. Although similar processing may be performed by the root node 604.

Upon receiving the message regarding the communication bridge at 638, the root node 606 may check to see (i) if the root node 606 has received a subscription message (to the multicast group) that originated at a node of the second network (e.g., is the node 610 a member of the multicast group), or (ii) if a node of the first network that has communicated with a node of the second network is a member of the multicast group (e.g., is the node 608 a member of the multicast group). In other words, the root node 606 checks to see if a node of the second, adjacent network that is able to communicate with the first network is a member of the multicast group and/or a node of the first network that is able to communicate with the second network is a member of the multicast group.

If the condition (i) and/or the condition (ii) is true (e.g., either or both of those nodes is a member), then the root node 606 does not need to do anything. Here, a PST would have already been established to link communication for the multicast group between the two networks. In other words, no bridge node is needed, because the networks would already be configured to distribute multicast data between the networks for the multicast group. For example, if the node 610 were already a member to the multicast group, then the node 610 would have already sent a subscription message into the first network for the multicast group. The subscription message would have been received by the node 608 and forwarded up to the root node 606 to form part of the PST in the first network. The rule used to facilitate this is to have a member (normal or conscripted) that is able to communicate with an adjacent network, send a subscription message in the member's network and the adjacent network when the node becomes the member.

If the condition (i) and the condition (ii) are false (e.g., neither of those nodes is a member), the root node 606 proceeds to perform operation 640 in FIG. 6B. Here, the selected node is a non-member node to the multicast group.

At 640, the root node 606 may select a node to bridge communication between the first network and the second network for a multicast group. The root node 606 may select a node of the first network that has previously communicated, or is otherwise able to communicate, with a node of the second network. The node may be selected based on a variety of information that is available to the root node 606. For example, the root node 606 may select a node within the first network that is closest to a member of the multicast group and that is within communication range of a node of the second network. In another example, the root node selects a node to provide the least routing cost between members of the multicast group and the node acting as the bridge (for example, the lowest number of transmissions to route data to members of the multicast group, or other measure of routing cost). In some instances, the same node is selected for different multicast groups, while in other instances separate nodes are selected for different multicast groups. To illustrate, a node that is currently acting as a bridge between networks for a first multicast group, may be selected to act as a bridge between those networks for a second multicast group.

At 642, the root node 606 sends a message to bridge communication between the first network and the second network for the multicast group. In this example, the bridge node 608 is selected to bridge communication, and thus, the message is sent to this node. At 644, the bridge node 608 receives the message from the root node 606. In some instances, the message is sent in a DIO communication, while in other instances the message is sent in other formats.

At 646, the bridge node 608 is configured to bridge communication between the first network and the second network for the multicast group. In many instances, the operation 646 may include configuring the bridge node 608 to act as a virtual member of the multicast group. In such instances, the message sent at operation 642 instructs the bridge node 608 to become a virtual member of the multicast group.

To become a virtual member, the bridge node 608 may send, at 648, a subscription message to the root node 606 of the first network. The subscription message may be received at 650 by the root node 606 of the first network. In other words, the subscription message may be sent node-by-node through the first network node(s) 612 to reach the root node 606. The subscription message may indicate that the bridge node 608 is becoming a virtual member of the multicast group. In response to receiving the subscription message indicating that the bridge node 608 is joining the multicast group as a virtual member, the root node 606 may update membership information for the multicast group at 652 (e.g., add the bridge node 608 and/or a multicast identifier for the multicast group to the list of multicast groups for the first network). The bridge node 608 may be flagged as a virtual member.

Additionally, to become the virtual member, the bridge node 608 may communicate with the node 610 of the second network via one or more nodes of the second network to form a communication bridge. As also illustrated at 648, this may include sending a subscription message to the node 610 to indicate that the bridge node 608 is becoming a virtual member of the multicast group. The subscription message may be received at 654 by the node 610 and forwarded on to the root node 604 of the second network. The subscription message may be sent node-by-node through one or more nodes of the second network to reach the root node 604 of the second network. The root node 604 may receive the subscription message at 656. In response to receiving the subscription message indicating that the bridge node 608 is joining the multicast group as a virtual member, the root node 604 may update membership information for the multicast group at 658 (e.g., add the bridge node 608 and/or a multicast identifier for the multicast group to the list of multicast groups for the second network). The bridge node 608 may be flagged as a virtual member.

In some instances, the subscription message sent at 648 is sent in a DAO communication, while in other instances the subscription message is sent in other formats.

Sending the subscription message up the first network and/or up the second network may cause a portion of a PST to be formed for the multicast group. For example, one or more messages may be sent to nodes in the first network and/or the second network to disable a pruning state and/or otherwise configure nodes so that the bridge node 608 receives multicast data for the multicast group. The PST may facilitate the distribution of multicast data for the multicast group between the first network and the second network.

In general, a virtual member of a multicast group performs operations like a member of the multicast group, but without processing multicast data. For example, the virtual member may receive multicast data for the multicast group in a similar fashion as if it were an actual member of the multicast group. The virtual member may also forward on the multicast data as needed (e.g., based on a PST structure). A virtual member does not usually process multicast data (e.g., at an application layer), but merely passes the multicast data on to another node.

If the bridge node 608 ever becomes an actual member of the multicast group, the bridge node 608 transmits a normal subscription message indicating membership in the multicast group. The subscription message may traverse each of the first and second networks to reach the respective root nodes. The root node 606 and the root node 604 may remove the designation of the bridge node 608 as a virtual member and list the bridge node 608 as a member.

Although the example of FIGS. 6A-6B discuss the bridge node 608 of the first network becoming a virtual member, in other instances the bridge node 608 may communicate with the node 610 of the second network to cause the node 610 to become the virtual member. Here, the node 610 may be implemented as a "bridge node" or "conscript," instead of the bridge node 608.

At some point after the bridge node 608 becomes a virtual member, and a PST is formed with the bridge node 608, multicast data for the multicast group may be distributed to members of the multicast group. In one example, multicast data originates in the first network and is sent from the first network node(s) 612. The bridge node 608 receives the multicast data at 660, and then forwards the multicast data on to the second network by sending it to the node 610, at 662. The multicast data may be received by the node 610 at 664. The multicast data may then be distributed through the second network according to the PST. In another example, multicast data that originates in the second network is sent, at 666, by the node 610 to the bridge node 608. The bridge node 608 receives the multicast data at 660 and forwards the multicast data on to the first network of nodes at 662 according to the PST. This may allow multicast data to be distributed to members of both networks.

Example Messages

Figure 7:
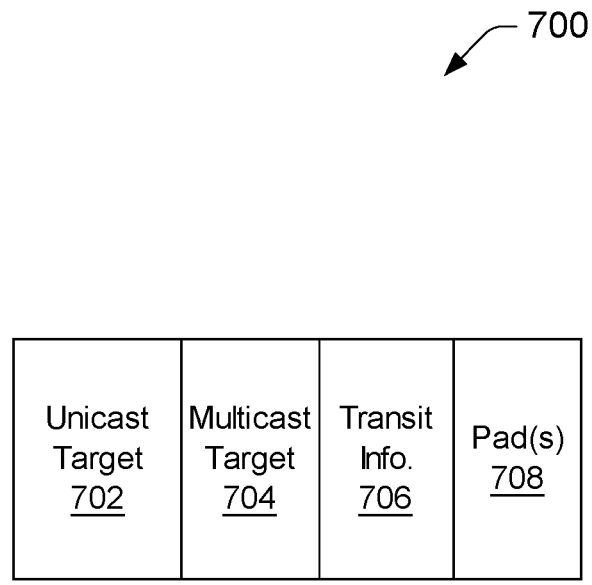
FIG. 7 illustrates an example portion of a subscription message to advertise that a node is a member of a multicast group.

FIG. 7 illustrates an example portion of a subscription message 700 to advertise that a node is a member of a multicast group. The portion of the subscription message 700 may form a Destination Advertisement Object (DAO) Base Object of a DAO message (e.g., ICMPv6 message). That is, the subscription message may correspond to the DAO message used in a Routing Protocol for Low Power and Lossy Networks (RPL) protocol, while the portion of the subscription message 700 may correspond to the DAO Base Object. However, the subscription message may take other forms and/or be implemented in other protocols.

A DAO message may generally be transmitted hop-by-hop to allow nodes in a network to have information about their sub-trees and/or optimize point-to-point routing. In many instances, a DAO message is transmitted by a node up the network to join the node to a root node and/or to maintain an existing relationship with a root node.

In this example, the portion of the DAO message 700 has a Unicast Target option 702, which carries an address (e.g., global unicast IPv6 address) of a given target. The Unicast Target option 702 identifies the node that originated the DAO message, such as the node that is subscribing to a multicast group.

The portion of the DAO message 700 also has a Multicast Target option 704 set to a multicast group address associated with a multicast group to which the node is subscribing. As such, the Multicast Target Option may indicate the multicast group to which the node is subscribing. To illustrate, the Multicast Target option 702 may carry a multicast address (e.g., IPv6 address) to which a concerned unicast target subscribes.

As illustrated, the portion of the DAO message 700 has a Transit Information option 706, which carries the unicast address (e.g., global IPv6 address) of a DAO parent of the concerned unicast target. Further, the portion of the DAO message 700 includes one or more Pad options 708 to ensure that a total length of a header is a multiple of 8 bytes.

Although illustrated in a particular order, any of the options 702-708 may be arranged differently. Further, any of the options 702-708 may be used in other types of messages and/or omitted from the DAO message.

The options 702-706 may be repeated for each RPL Unicast Target described in the DAO. Furthermore, the option 706 may be repeated for each DAO parent of the concerned unicast target. Further, the Multicast Target option 702 may occur N times (where N is an integer greater than or equal to zero and corresponds to the number of multicast groups of which the node is a member). For example, if the node is a member of multiple multicast groups, the multicast address (i.e., the multicast Target option 702) of each group would be included, one after the other, in the DAO.

The information in the portion of the DAO message 700 may be inspected as the DAO message is transmitted throughout a network (e.g., at each hop). For example, the Unicast Target option 702 and the Multicast Target option 704 may be inspected to identify a multicast group to which the node is subscribing. This information may be used to update a data structure indicating membership of the node in the multicast group.

Figure 8:
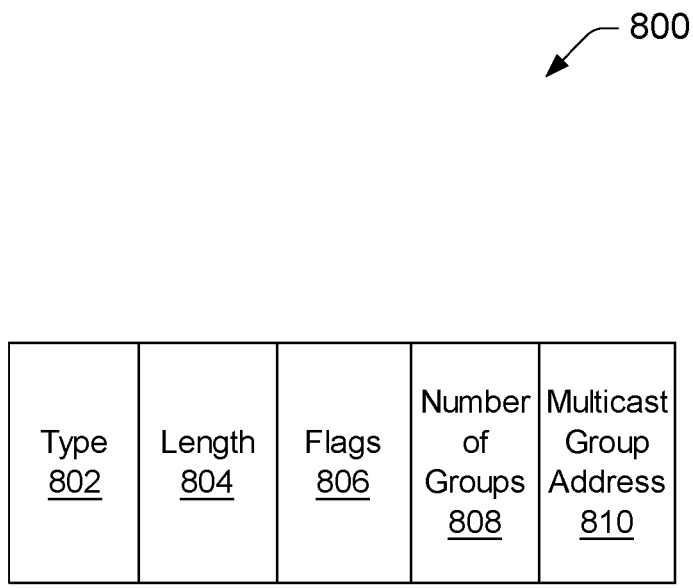
FIG. 8 illustrates an example portion of a message to instruct a node to disable or enable a pruning state.

FIG. 8 illustrates an example portion of a message 800 to instruct a node to disable or enable a pruning state. Such message is often referred as a MinP message. The MinP 800 may correspond to a DODAG Information Object (DIO) message used in the RPL protocol, while the portion of the MinP message 800 corresponds to a new option that is provided within a DIO message. Such option is also referred to as a PST-MinP option. The example PST-MinP option 800 is just one of many forms of implementation. Here, the example PST-MinP option 800 is for a Type-Length-Value (TLV) structure. However, a variety of other structures and/or fields may be used.

The PST-MinP option 800 may identify one or more multicast groups for which pruning should be disabled. Here, the PST-MinP option 800 includes a type field 802, which indicates a type of the option (e.g., that the option is a PST-MinP option), and a length field 804, which indicates a length of the PST-MinP option 800 (excluding the type field 802 and the length field 804). The PST-MinP option 800 also includes a flags field 806 that is part of a TLV structure, and a number of groups field 808 that indicates a number of multicast groups advertised in this option. Further, the PST-MinP option 800 includes a multicast group address field 810 that includes a multicast address of each advertised group. In other words, the multicast group address field 810 declares one or more multicast group addresses for which child nodes of a transmitting node must disable a pruning state. As such, the multicast group address field 810 identifies multicast groups for which to disable a pruning state.

Although illustrated in a particular order, any of the fields 802-810 may be arranged differently. Further, any of the fields 802-810 may be used in other types of messages and/or omitted from the DIO message.

In some instances, a DIO message with the PST-MinP option 800 is transmitted as a link-local multicast packet. The DIO message is processed if received from a preferred parent. To illustrate, a DIO message may be sent as a one-hop multicast transmission and filtered by recipients to only be processed if received from a PST parent.

The information in the PST-MinP option 800 may be processed to update a pruning state. For example, a node that receives the PST-MinP option 800 in a message may analyze the multicast group address field 810 to identify a multicast group for which to disable the pruning state.

Example Processes

Figure 9:
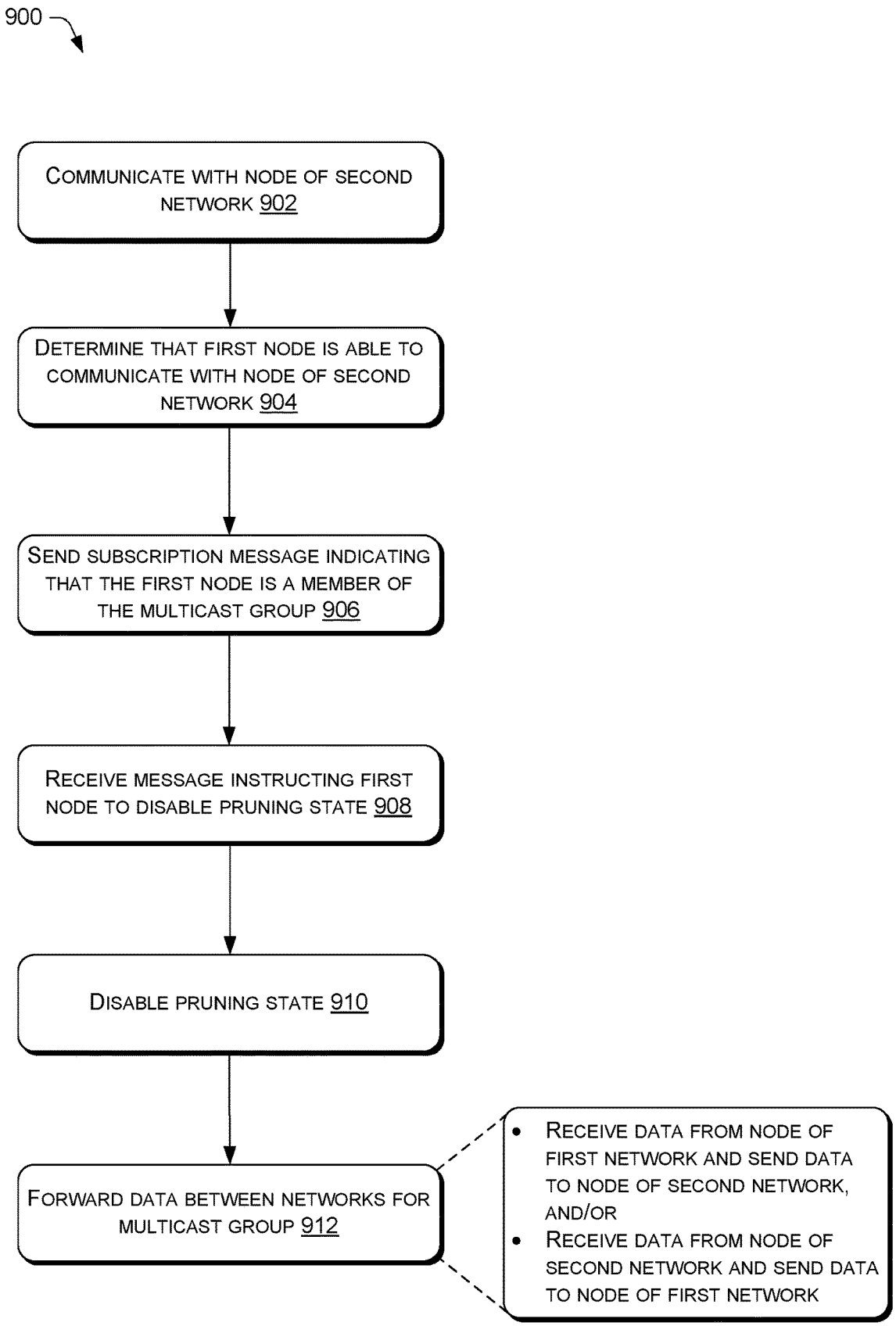
FIG. 9 illustrates an example process to bridge communication between networks with a member node acting as a bridge.
Figure 10:
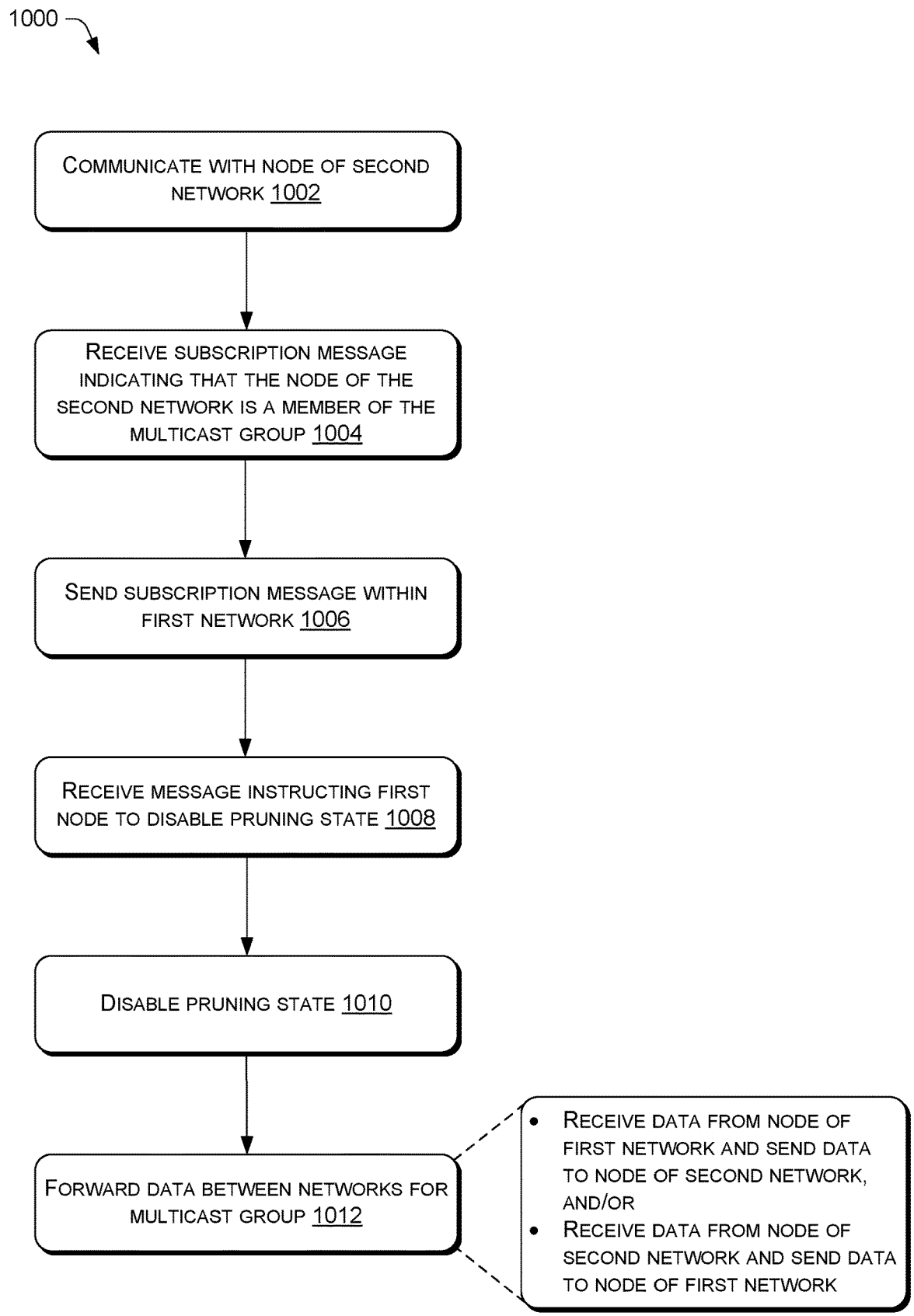
FIG. 10 illustrates an example process to bridge communication between networks with a member in an adjacent network.
Figure 11:
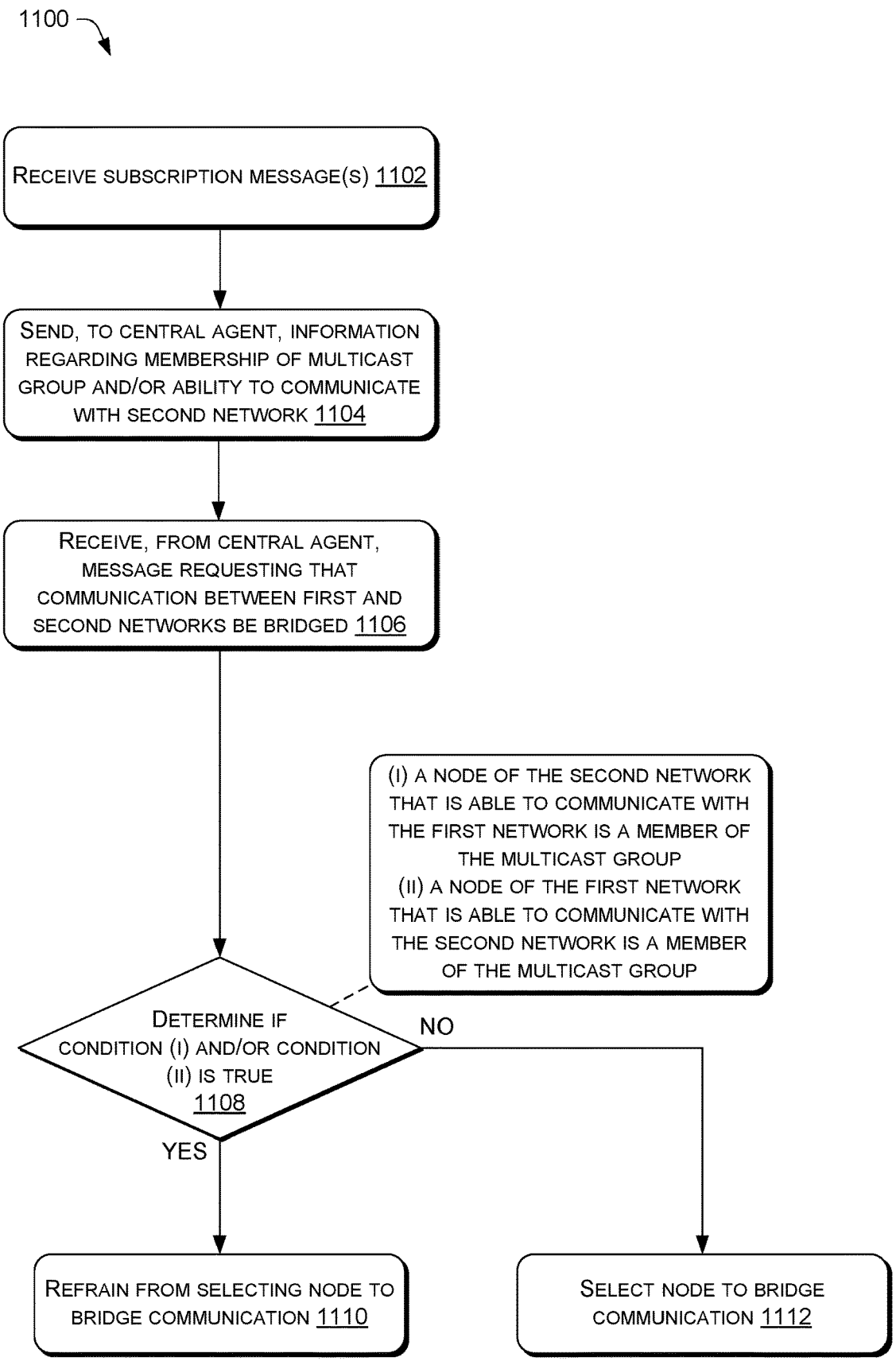
FIG. 11 illustrates an example process at a root node to bridge communication between networks.

FIGS. 9, 10, and 11 illustrate example processes 900, 1000, and 1100 for employing the techniques discussed herein. The processes 900, 1000, and 1100 may be performed by any type of device, such as the service provider 106, the node 200, or any other device.

The processes 900, 1000, and 1100 (as well as each process described herein) are illustrated as logical flow graphs, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

FIG. 9 illustrates the example process 900 to bridge communication between networks with a member node acting as a bridge.

At 902, a first node of a first network may communicate with a node of a second network. This may include sending and/or receiving any number of communications to discover each other. In some instances, the node of the second network is a member of a multicast group, while in other instances the node is not.

At 904, the first node may determine that the first node is able to communicate with the node of the second network. This may be based on the communication at the operation 902.

At 906, the first node may send a subscription message indicating that the first node is a member of a multicast group. The message may be sent to the node of the second network, a node of the first network, and/or any other node that is within communication range. The subscription message may traverse the first network and/or the second network to reach the respective root node. In some instances, the operation 906 is based on the determining that the first node is able to communicate with the node of the second network.

At 908, the first node may receive a message instructing the first node to disable a pruning state. The message may be received from a node of the first network, such as a parent node, and/or received from a node of the second network.

At 910, the first node may disable the pruning state based on the receipt of the message at operation 908.

At 912, the first node may forward data between the first network and the second network for the multicast group. The data may be destined for members of the multicast group. In some instances, the forwarding includes receiving the data from a node of the first network and sending the data to a node of the second network. In other instances, the forwarding includes receiving the data from a node of the second network and sending the data to a node of the first network. In some examples, the forwarding may be based on determining that the pruning state is disabled.

FIG. 10 illustrates the example process 1000 to bridge communication between networks with a member in an adjacent network.

At 1002, a first node of a first network may communicate with a node of a second network. This may include sending and/or receiving any number of communications to discover each other. In some instances, the first node is a member of a multicast group, while in other instances the first node is not.

At 1004, the first node may receive a subscription message indicating that the node of the second network is a member of the multicast group. The subscription message may be received from the node of the second network.

At 1006, the first node may send the subscription message within the first network to reach a root node of the first network. For example, the first node may send the subscription message to a parent node or another node that is able to hear the first node. The subscription message may traverse the first network to reach a root node.

At 1008, the first node may receive a message instructing the first node to disable a pruning state. The message may be received from a node of the first network, such as a parent node, and/or received from a node of the second network.

At 1010, the first node may disable the pruning state based on the receipt of the message at 1008.

At 1012, the first node may forward data between the first network and the second network for the multicast group. The data may be destined for members of the multicast group. In some instances, the forwarding includes receiving the data from a node of the first network and sending the data to the node of the second network. In other instances, the forwarding includes receiving the data from the node of the second network and sending the data to a node of the first network. In some examples, the forwarding may be based on determining that the pruning state is disabled.

FIG. 11 illustrates the example process 1100 at a root node to bridge communication between networks.

At 1102, a root node of a first network may receive a subscription message indicating that a node of the first network is subscribing to a multicast group (e.g., is a member of the multicast group). The root node may receive subscription messages from any number of nodes of the first network indicating that the nodes are members of the multicast group. Additionally, or alternatively, the root node may receive any number of subscription messages indicating that a node of a second network is a member of the multicast group. For example, a node of the second network that is able to communicate with a node of the first network may send a subscription message to the node of the first network. The subscription message may traverse the first network to reach the root node.

At 1104, the root node may send, to a central agent, information indicating that the first network includes a member of a multicast group and/or that the first network is able to communicate with a second network. The information may be based on a subscription message(s) received at 1102. The information that is sent to the central agent may include a list of multicast groups that have members in the first network and/or a list of networks that have communicated with the first network.

At 1106, the root node may receive, from the central agent, a message requesting that the root node bridge communication between the first network and the second network to allow distribution of data to members of the multicast group. The message may include a list of networks that are adjacent to the first network and that are requested to connect to in bridging communication for the multicast group.

At 1108, the root node may determine if (i) a node of the second network that is able to communicate with the first network is a member of the multicast group, and/or (ii) a node of the first network that is able to communicate with the second network is a member of the multicast group.

If the condition (i) and/or the condition (ii) is true, then the process 1100 may proceed to 1110. If not, then the process 1100 may proceed to 1112.

At 1110, the root node may refrain from selecting a node to bridge communication between the first network and the second network. Here, a bridge has already been established by the member node of the second network that is able to communicate with the first network or the member node of the first network that is able to communicate with the second network.

At 1112, the root node may select a node to bridge communication between the first network and the second network. In one example, the operation 1112 may perform the processing of operation 640 of FIG. 6B and continue to 642 and so on. In another example, other processing may be performed to select a node to bridge communication.

What is claimed is:

1. A first node of a first network, the first node comprising:
one or more processors; and
memory communicatively coupled to the one or more processors, the memory storing one or more instructions that, when executed by the one or more processors, cause the one or more processors to perform operations comprising:
sending, to a second node of the first network and a third node of a second network, a subscription message indicating that the first node is a member of a multicast group, the subscription message being sent via the first network and the second network and directed to a root node of the first network and to a root node of the second network; and
forwarding data between the first network and the second network for the multicast group, the data being destined for members of the multicast group, the forwarding including at least one of:
receiving the data from the second node of the first network and sending the data to the third node of the second network; or
receiving the data from the third node of the second network and sending the data to the second node of the first network.

2. The first node of claim 1, wherein the forwarding data comprises receiving the data from the second node of the first network and sending the data to the third node of the second network.

3. The first node of claim 1, wherein the forwarding data comprises receiving the data from the third node of the second network and sending the data to the second node of the first network.

4. The first node of claim 1, wherein the operations further comprise:
receiving, from at least one of the second node or the third node, a message instructing the first node to disable a pruning state of the first node; and
disabling the pruning state of the first node.

5. The first node of claim 1, wherein the operations further comprise:
communicating with the third node of the second network; and
determining that the first node is able to communicate with the third node;
wherein the sending the subscription message is based at least in part on determining that the first node is able to communicate with the third node.

6. The first node of claim 1, wherein the third node of the second network comprises another member of the multicast group.

7. The first node of claim 1, wherein the first node comprises a Limited Function Device (LFD).

8. A method implemented at least in part by a first node of a first network, the method comprising:
sending, by the first node and to a second node of the first network and a third node of a second network, a subscription message indicating that the first node is a member of a multicast group, the subscription message being sent via the first network and the second network and directed to a root node of the first network and to a root node of the second network; and forwarding, by the first node, data between the first network and the second network for the multicast group, the data being destined for members of the multicast group, the forwarding including at least one of:

receiving, by the first node, the data from the second node of the first network and sending the data to the third node of the second network; or receiving, by the first node, the data from the third node of the second network and sending the data to the second node of the first network.

9. The method of claim 8, wherein the forwarding data comprises receiving the data from the second node of the first network and sending the data to the third node of the second network.

10. The method of claim 8, wherein the forwarding data comprises receiving the data from the third node of the second network and sending the data to the second node of the first network.

11. The method of claim 8, further comprising:
receiving, from at least one of the second node or the third node, a message instructing the first node to disable a pruning state of the first node; and
disabling the pruning state of the first node.

12. The method of claim 8, wherein the third node of the second network comprises another member of the multicast group.

13. The method of claim 8, further comprising:
communicating with the third node of the second network; and
determining that the first node is able to communicate with the third node;
wherein the sending the subscription message is based at least in part on the determining that the first node is able to communicate with the third node.

14. The method of claim 8, wherein the first node comprises a Limited Function Device (LFD).

15. One or more non-transitory computer-readable media storing executable instructions that, when executed by one or more processors of a first node of a first network, cause the one or more processors to perform operations comprising:

sending, to a second node of the first network and a third node of a second network, a subscription message indicating that the first node is a member of a multicast group, the subscription message being sent via the first network and the second network and directed to a root node of the first network and a root node of the second network; and forwarding, by the first node, data between the first network and the second network for the multicast group, the data being destined for members of the multicast group, the forwarding including at least one of:

receiving, by the first node, the data from the second node of the first network and sending the data to the third node of the second network; or receiving, by the first node, the data from the third node of the second network and sending the data to the second node of the first network.

16. The one or more non-transitory computer-readable media of claim 15, wherein the forwarding data comprises receiving the data from the second node of the first network and sending the data to the third node of the second network.

17. The one or more non-transitory computer-readable media of claim 15, wherein the forwarding data comprises receiving the data from the third node of the second network and sending the data to the second node of the first network.

18. The one or more non-transitory computer-readable media of claim 15, wherein the operations further comprise:
receiving, from at least one of the second node or the third node, a message instructing the first node to disable a pruning state of the first node; and
disabling the pruning state of the first node.

19. The one or more non-transitory computer-readable media of claim 15, wherein the operations further comprise:
communicating with the third node of the second network; and
determining that the first node is able to communicate with the third node;
wherein the sending the subscription message is based at least in part on the determining that the first node is able to communicate with the third node.

20. The one or more non-transitory computer-readable media of claim 15, wherein the third node of the second network comprises another member of the multicast group.

* * * * *